United States Patent
Mazzoccoli et al.

(10) Patent No.: US 12,064,745 B2
(45) Date of Patent: Aug. 20, 2024

(54) IRON AND NITROGEN TREATED SORBENT AND METHOD FOR MAKING SAME

(71) Applicants: CALGON CARBON CORPORATION, Moon Township, PA (US); KURARAY CO., LTD., Kurashiki (JP)

(72) Inventors: Jason P. Mazzoccoli, Pittsburgh, PA (US); Ryan W. Walker, Pittsburgh, PA (US); Walter G. Tramposch, Moon Township, PA (US); Keita Takahashi, Bizen (JP); Aya Benzaki, Bizen (JP)

(73) Assignees: CALGON CARBON CORPORATION, Moon Township, PA (US); KURARAY CO., LTD., Kurashiki (JP)

(*) Notice: Subject to any disclaimer, the term of this patent is extended or adjusted under 35 U.S.C. 154(b) by 90 days.

(21) Appl. No.: 17/446,501

(22) Filed: Aug. 31, 2021

(65) Prior Publication Data

US 2022/0062855 A1 Mar. 3, 2022

Related U.S. Application Data

(60) Provisional application No. 63/072,514, filed on Aug. 31, 2020.

(51) Int. Cl.
*B01J 20/20* (2006.01)
*B01J 20/02* (2006.01)
(Continued)

(52) U.S. Cl.
CPC .......... *B01J 20/20* (2013.01); *B01J 20/0229* (2013.01); *B01J 20/0259* (2013.01);
(Continued)

(58) Field of Classification Search
CPC .... B01J 20/20; B01J 20/0229; B01J 20/0259; B01J 20/3078; B01J 20/3085;
(Continued)

(56) References Cited

U.S. PATENT DOCUMENTS

| | | |
|---|---|---|
| 2,038,071 A | 4/1936 | Wilhelm |
| 3,713,281 A | 1/1973 | Asker et al. |
| | | (Continued) |

FOREIGN PATENT DOCUMENTS

| | | |
|---|---|---|
| CA | 2485103 A1 | 11/2003 |
| CN | 108940191 A | 12/2018 |
| | | (Continued) |

OTHER PUBLICATIONS

Takahashi et al. WO2018116842A1 English Translation (Year: 2018).*

(Continued)

*Primary Examiner* — Sally A Merkling
*Assistant Examiner* — Jordan W Taylor
(74) *Attorney, Agent, or Firm* — DLA Piper LLP (US)

(57) ABSTRACT

Carbonaceous material that is activated to form precursor activated carbon is further enhanced by doping with iron and nitrogen and calcining. The resultant sorbent material has excellent catalytic properties which are useful in the field of fluid purification. The further enhancement can be performed in a single stage process or a dual stage process. The carbonaceous material includes those obtained from coal, wood, or coconut shells. The described treatment processes result in a sorbent material that has excellent performance in removing chloramine and similar compounds from fluids such as water that is intended for drinking.

31 Claims, 11 Drawing Sheets

(51) Int. Cl.
*B01J 20/28* (2006.01)
*B01J 20/30* (2006.01)
*C02F 1/28* (2023.01)
*C02F 101/16* (2006.01)

(52) U.S. Cl.
CPC ....... *B01J 20/3078* (2013.01); *B01J 20/3085* (2013.01); *C02F 1/283* (2013.01); *B01J 20/2808* (2013.01); *B01J 2220/42* (2013.01); *B01J 2220/4806* (2013.01); *B01J 2220/4825* (2013.01); *B01J 2220/4881* (2013.01); *C02F 2101/16* (2013.01); *C02F 2303/04* (2013.01)

(58) Field of Classification Search
CPC .. B01J 20/2808; B01J 20/02; B01J 20/28011; B01J 20/28071; B01J 20/0237; B01J 2220/42; B01J 2220/4806; B01J 2220/4825; B01J 2220/4881; C02F 1/283; C02F 1/288; C02F 2101/16; C02F 2303/04
See application file for complete search history.

(56) References Cited

U.S. PATENT DOCUMENTS

| | | |
|---|---|---|
| 3,757,488 A | 9/1973 | Austin et al. |
| 4,331,639 A | 5/1982 | Hass et al. |
| 4,624,937 A | 11/1986 | Chou |
| 4,921,826 A | 5/1990 | Juntgen et al. |
| 5,016,628 A | 5/1991 | Lambert |
| 5,248,395 A | 9/1993 | Rastelli et al. |
| 5,322,778 A | 6/1994 | Antrim et al. |
| 5,338,458 A | 8/1994 | Carrubba et al. |
| 5,348,755 A | 9/1994 | Roy |
| 5,352,274 A | 10/1994 | Blakley |
| 5,356,849 A | 10/1994 | Matviya et al. |
| 5,500,038 A | 3/1996 | Dauber et al. |
| 5,504,050 A | 4/1996 | Hayden |
| 5,598,721 A | 2/1997 | Rockenfeller et al. |
| 5,754,002 A | 5/1998 | Haitko et al. |
| 5,821,682 A | 10/1998 | Foust et al. |
| 5,861,050 A | 1/1999 | Pittel et al. |
| 6,176,897 B1 | 1/2001 | Keefer |
| 6,186,939 B1 | 2/2001 | Forrester |
| 6,342,129 B1 | 1/2002 | Vaughn et al. |
| 6,406,523 B1 | 6/2002 | Connor et al. |
| 6,599,856 B1 | 7/2003 | Uchino et al. |
| 6,699,393 B2 | 3/2004 | Baker et al. |
| 6,706,194 B2 | 3/2004 | Baker et al. |
| 6,848,374 B2 | 2/2005 | Srinivasachar et al. |
| RE38,844 E | 10/2005 | Hiltzik et al. |
| 7,077,891 B2 | 7/2006 | Jaffe et al. |
| 7,222,612 B2 | 5/2007 | Hagler et al. |
| 7,278,406 B2 | 10/2007 | Hagler |
| 7,361,280 B2 | 4/2008 | Baker |
| 7,547,350 B2 | 6/2009 | Callahan et al. |
| 7,666,507 B2 | 2/2010 | Ishikawa et al. |
| 7,704,305 B2 | 4/2010 | Nishida |
| 7,780,765 B2 | 8/2010 | Srinivasachar et al. |
| 7,858,061 B2 | 12/2010 | Varma et al. |
| 7,862,725 B2 | 1/2011 | Mazyck et al. |
| 7,879,136 B2 | 2/2011 | Mazyck |
| 7,923,410 B2 | 4/2011 | Turk et al. |
| 8,034,163 B1 | 10/2011 | Durham et al. |
| 8,042,524 B2 | 10/2011 | Elum et al. |
| 8,057,576 B1 | 11/2011 | Pollack |
| 8,069,797 B2 | 12/2011 | Srinivasachar et al. |
| 8,080,088 B1 | 12/2011 | Srinivasachar |
| 8,168,147 B2 | 5/2012 | Olson et al. |
| 8,263,524 B1 | 9/2012 | Skandan et al. |
| 8,864,877 B2 | 10/2014 | Nishita et al. |
| 9,120,079 B1 | 9/2015 | Dietz et al. |
| 9,174,205 B2 | 11/2015 | Reimerink-Schats et al. |
| 9,199,862 B2 | 12/2015 | Kuramitsu et al. |
| 9,732,649 B2 | 8/2017 | Hiltzik et al. |
| 10,155,673 B2 * | 12/2018 | Stouffer .................. C02F 1/283 |
| 10,702,853 B2 | 7/2020 | Mazzoccoli et al. |
| 11,872,539 B2 | 1/2024 | Mazzoccoli et al. |
| 11,911,743 B2 | 2/2024 | Distefano et al. |
| 2002/0170436 A1 | 11/2002 | Keefer et al. |
| 2003/0188663 A1 | 10/2003 | Barthel et al. |
| 2004/0118287 A1 | 6/2004 | Jaffe et al. |
| 2004/0118387 A1 | 6/2004 | Lawrence |
| 2005/0081717 A1 | 4/2005 | Meiller et al. |
| 2005/0150835 A1 | 7/2005 | Vo |
| 2005/0167367 A1 | 8/2005 | Baker |
| 2006/0042467 A1 | 3/2006 | Maru |
| 2006/0054142 A1 | 3/2006 | Burke et al. |
| 2007/0169758 A1 | 7/2007 | Mills |
| 2007/0272080 A1 | 11/2007 | Allen et al. |
| 2008/0073290 A1 | 3/2008 | Ryan et al. |
| 2008/0121142 A1 | 5/2008 | Comrie et al. |
| 2008/0283446 A1 | 11/2008 | Tatarchuk et al. |
| 2008/0308075 A1 | 12/2008 | Allen et al. |
| 2009/0172998 A1 | 7/2009 | Harris et al. |
| 2009/0223370 A1 | 9/2009 | Kosugi et al. |
| 2010/0178624 A1 | 7/2010 | Srinivasachar |
| 2011/0030592 A1 | 2/2011 | Baldrey et al. |
| 2011/0076210 A1 | 3/2011 | Pollack et al. |
| 2012/0048110 A1 | 3/2012 | Dawes et al. |
| 2012/0100054 A1 | 4/2012 | Durham et al. |
| 2012/0172216 A1 | 7/2012 | Bohringer et al. |
| 2012/0220451 A1 | 8/2012 | Miyata et al. |
| 2013/0078169 A1 | 3/2013 | LaFlesh et al. |
| 2013/0109562 A1 | 5/2013 | Wong et al. |
| 2013/0168321 A1 | 7/2013 | Cannon et al. |
| 2013/0269532 A1 | 10/2013 | Kimoto |
| 2013/0316433 A1 | 11/2013 | Huang |
| 2014/0112856 A1 | 4/2014 | Krutka et al. |
| 2014/0117054 A1 | 5/2014 | Ryan et al. |
| 2014/0165542 A1 | 6/2014 | Loftin et al. |
| 2014/0336568 A1 | 11/2014 | Wong |
| 2015/0050202 A1 | 2/2015 | Filippelli et al. |
| 2016/0023920 A1 | 1/2016 | Doyle et al. |
| 2016/0102019 A1 | 4/2016 | Pollack et al. |
| 2016/0166972 A1 | 6/2016 | Owens et al. |
| 2016/0167982 A1 | 6/2016 | Stouffer et al. |
| 2016/0236169 A1 | 8/2016 | Doughty et al. |
| 2016/0271555 A1 | 9/2016 | Hiltzik et al. |
| 2016/0346723 A1 | 12/2016 | Honore et al. |
| 2017/0297926 A1 | 10/2017 | Nickelsen et al. |
| 2018/0030871 A1 | 2/2018 | Hiltzik et al. |
| 2018/0214816 A1 | 8/2018 | Greenbank |
| 2019/0201870 A1 | 7/2019 | Kumar Pal et al. |
| 2019/0247831 A1 | 8/2019 | Tramposch et al. |
| 2019/0270081 A1 | 9/2019 | Ilinich et al. |
| 2020/0038798 A1 | 2/2020 | Greenbank et al. |
| 2020/0039809 A1 | 2/2020 | Greenbank et al. |
| 2020/0040851 A1 | 2/2020 | Greenbank et al. |
| 2020/0179902 A1 | 6/2020 | Huang |
| 2020/0316560 A1 | 10/2020 | Distefano et al. |

FOREIGN PATENT DOCUMENTS

| | | |
|---|---|---|
| DE | 3620425 C1 | 6/1987 |
| EP | 0433677 A1 | 6/1991 |
| EP | 1413348 A1 | 4/2004 |
| EP | 1521723 A1 | 4/2005 |
| FR | 3077069 A1 | 7/2019 |
| GB | 1336241 A | 11/1973 |
| JP | H-01058331 B2 | 3/1989 |
| JP | 2008023365 A | 2/2008 |
| KR | 20120074080 A | 7/2012 |
| WO | 198100399 A1 | 2/1981 |
| WO | 2009031562 A1 | 3/2009 |
| WO | 2010042321 A1 | 4/2010 |
| WO | 2011038415 A2 | 3/2011 |
| WO | 2011127323 A2 | 10/2011 |
| WO | 2013063490 A1 | 5/2013 |
| WO | 2013096281 A1 | 6/2013 |
| WO | 2013149241 A1 | 10/2013 |
| WO | 2014082076 A1 | 5/2014 |
| WO | 2014088630 A1 | 6/2014 |

(56) References Cited

FOREIGN PATENT DOCUMENTS

| WO | 2014205200 | A1 | | 12/2014 | |
|----|------------|-----|---|---------|---|
| WO | 2016185033 | A1 | | 11/2016 | |
| WO | 2017180346 | A1 | | 10/2017 | |
| WO | WO-2018116842 | A1 | * | 6/2018 | ......... B01D 53/8659 |
| WO | 2018144588 | A1 | | 8/2018 | |
| WO | 2018175936 | A1 | | 9/2018 | |
| WO | 2020028703 | A2 | | 2/2020 | |
| WO | 2020028839 | A1 | | 2/2020 | |
| WO | 2020028845 | A1 | | 2/2020 | |

OTHER PUBLICATIONS

Xu et al. Journal of Colloid and Interface Science 2018, 523, 144-150 (Year: 2018).*

"The Chemistry of Nitrogen and Phosphorous." Purdue Chemistry, Purdue University, (2006) chemed.chem.purdue.edu/genchem/topicreview/bp/ch10/group5.php#negative.

Johnson et al., "Advanced Filtration Membranes for the Removal of Perfluoroalkyl Species from Water", American Chemical Society, ACS Omega, May 2, 2019, vol. 4(5), pp. 8001-8006.

McNamara et al., "Comparison of Activated Carbons for Removal of Perfluorinated Compounds From Drinking Water", Article in Journal AWWA, Jan. 2018; Retrieved from Internet on Sep. 22, 2021. url <https://cswab.org/wp-content/uploads/2018/12/Activated-Carbons-Comparison-for-Removal-of-PFAS-in-Drinking-Water-McNamara-2018.pdf>.

Raposo et al., Mercury Speciation in Fluorescent Lamps by Thermal Release Analysis (2003), Waste Management 23(10):879-886.

Sharifi et al., "Formation of Active Sites for Oxygen Reduction Reactions by Transformation of Nitrogen Functionalities in Nitrogen-Doped Carbon Nanotubes." ACS Nano, vol. 6, No. 10, 2012, pp. 8904-8912, doi:10.1021/nn302906r.

Wang et al., "Influence of cations on the partition behavior of perfluoroheptanoate (PFHpA) and perfluorohexanesulfonate (PFHxS) on waste water sludge", Chemosphere, vol. 131, Jul. 2015, pp. 178-183.

Westreich et al., "The removal of short-chain and long-chain perfluoroalkyl acids and sulfonates via granular activated carbons: A comparative column study", Remediation Journal, Dec. 4, 2018; vol. 29(1) pp. 19-26.

Barrios-Bermudez et al. "Fe—Cu Doped Multiwalled Carbon Nanotubes for Fenton-like Degradation of Paracetamol under Mild Conditions" Apr. 14, 2020, Nanomaterials 10(749):1-18.

Sontheimer et al. "Evaluation Methods Utilizing Aqueous Solutions, in Activated Carbon for Water Treatment" 1988, DVGW-Forschungsstelle Second Edition 100-105.

Appleman et al., "Treatment of poly-and perfluoroalkyl substances in U.S. full-scale water treatment systems", Water Research, vol. 51 pp. 246-255 (2014).

Pietrzak et al. "Preparation of Nitrogen-Enriched Activated Carbons from Brown Coal" 2006, Energy & Fuels 20:1275-1280.

Zhang, et al., "Nanostructured iron(III)-copper(II) binary oxide: A novel adsorbent for enhanced arsenic removal from aqueous solutions", Water Research, Mar. 22, 2013, vol. 47, pp. 4022-4031.

* cited by examiner

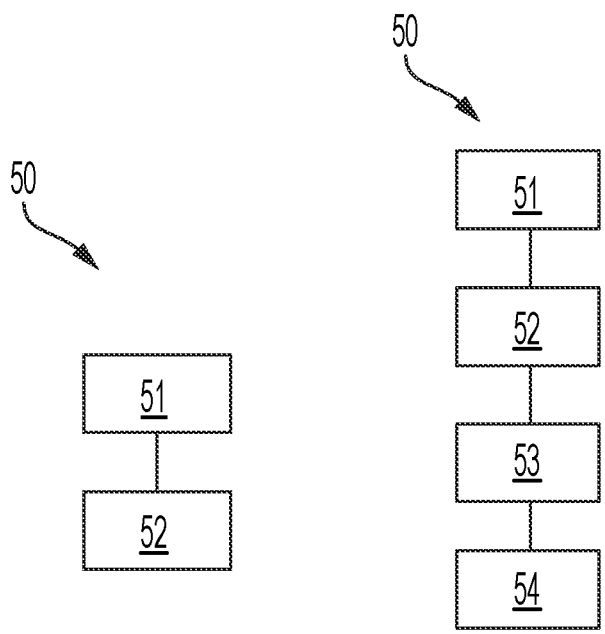

IRON AND NITROGEN TREATED SORBENT AND METHOD FOR MAKING SAME

CROSS-REFERENCE TO RELATED APPLICATIONS

This application claims the benefit of U.S. Provisional Patent Application No. 63/072,514 filed Aug. 31, 2020, the entirety of which is incorporated by reference herein.

FIELD

Fluids such as water are routinely disinfected by adding oxidizing compounds, irradiating the water with ultraviolet radiation, or both. While these techniques are effective at disinfecting the water, the disinfected water will often include the oxidizing compounds themselves, products of the oxidizing compounds as they dissolve in the water, or reaction compounds that result from the irradiation of the water that contains various constituent compounds. Collectively, these various compounds include chlorine, chloramines, chloroform, trihalomethanes, haloacetic acids, and hydrogen peroxides. These compounds are undesired because they alter the smell and taste of the water, cause health problems, and can cause corrosion of mains and service lines.

To remove these compounds, sorbents have been used. The sorbents absorb and adsorb the various compounds. In particular, the pores of sorbents permit the adsorption of the compounds. However, pure sorbents are inefficient and only adsorb a fraction of the compounds that must be removed. To increase their effectiveness, the sorbents are sometimes treated with compounds to form catalytic sorbent. Catalytic species are usually present on the surface of the sorbent particles and function by catalyzing the chemical decomposition of those undesired compounds that adsorb or absorb poorly on the sorbent. By employing both mechanisms of adsorption and catalysis, a catalytic sorbent is significantly more efficient than a pure, untreated sorbent. Catalytic sorbents have proven effective for removing chlorine, chloramines, chloroform, trihalomethanes, haloacetic acids, and hydrogen peroxides from water and other fluids. Even so, there remains a continued need to improve the various steps of forming such catalytic sorbents, and thereby improve overall sorbent performance.

SUMMARY

Carbonaceous material that is activated to form precursor activated carbon is further enhanced by doping with iron and nitrogen and calcining. The resultant sorbent material has excellent catalytic properties which are useful in the field of fluid purification.

In one embodiment, there is a sorbent material formed from a carbonaceous material that is activated to form a precursor activated carbon, the sorbent material comprising: at least about 1.3 wt. % nitrogen as measured on a dry precursor activated carbon basis; at least about 1,000 mg/kg of iron as measured on a dry precursor activated carbon basis; and wherein the sorbent material has a volumetric chloramine removal amount of about 70 mg/mL or more when measured with a stream of water that contacts the sorbent material.

In another embodiment, the sorbent material has volumetric chloramine removal performance of about 70 mg/mL to about 350 mg/mL when measured with a stream of water containing chloramine that contacts a volume of the sorbent material.

In another embodiment, the amount of nitrogen in the sorbent material is about 1.3 wt. % to about 3.0 wt. %.

In another embodiment, the sorbent material has a peroxide destruction number of about 2.5 minutes to about 45 minutes.

In another embodiment, the sorbent material has a chloramine destruction number (CDN) that is at least about 25.

In another embodiment, the CDN of the sorbent material is about 25 to about 125.

In another embodiment, the peroxide number of the sorbent material is less than about 25 minutes.

In another embodiment, the sorbent material has a peroxide number is about 3 minutes to about 10 minutes.

In another embodiment, the sorbent material is formed from a carbonaceous material that is formed from one or more of coal, wood, and coconut.

In another embodiment, at least part the carbonaceous material is formed from coconut.

In another embodiment, the sorbent material contains at least about 0.110 mL/g of micropores, with each micropore having a pore diameter of about 0.36 nm to about 0.46 nm; and the sorbent material has a volumetric chloroform removal performance of about 0.25 mg/mL or more when measured with a stream of water containing chloroform that contacts a volume of the sorbent material.

In another embodiment, the sorbent material has a volumetric chloroform removal amount of about 0.25 mg/mL to about 0.90 mg/mL.

In one embodiment, there is a method of manufacturing a sorbent material, the method comprising: providing a carbonaceous material; activating the carbonaceous material to form a precursor activated carbon; optionally oxidizing the precursor activated carbon; doping the precursor activated carbon by contacting the precursor activated carbon with an iron source and a nitrogen source to thereby form a doped precursor activated carbon; calcining the doped precursor activated carbon by heating to a temperature of at least about 400° C. in a calcining atmosphere that does not cause any substantial oxidation or activation of the doped precursor activated carbon to thereby form a sorbent material.

In another embodiment, doping the precursor activated carbon is performed in a two stage process, the two stage process including separate steps of contacting the precursor activated carbon with an iron source and contacting the precursor activated carbon with a nitrogen source.

In another embodiment, contacting the precursor activated carbon with an iron source and contacting the precursor activated carbon with a nitrogen source are each performed with separate aqueous solutions.

In another embodiment, the precursor activated carbon is dried after it is contacted with each aqueous solution containing the iron source and the nitrogen source.

In another embodiment, the iron source is one or more of iron(III) chloride hexahydrate ($FeCl_3 \cdot 6H_2O$), iron(II) chloride tetrahydrate ($FeCl_2 \cdot 4H_2O$), ammonium iron(III) sulfate dodecahydrate ($NH_4Fe(SO_4) \cdot 12H_2O$), iron(II) sulfate heptahydrate ($Fe_2SO_4 \cdot 7H_2O$), ammonium iron(III) oxalate trihydrate ($(NH_4)_3Fe(C_2O_4)_3 \cdot 3H_2O$), ammonium hexacyanoferrate(II) hydrate ($(NH_4)_4[Fe(CN)_6] \cdot xH_2O$), ammonium iron(III) citrate ($(NH_4)_5[Fe(C_6H_4O_7)_2]$), sodium ferrocyanide decahydrate ($Na_4Fe(CN)_6 \cdot 10H_2O$), sodium ferrioxalate ($Na_3Fe(C_2O_4)_3$), potassium ferrocyanide trihydrate ($K_4[Fe(CN)_6] \cdot 3H_2O$), potassium ferricyanide ($K_3[Fe(CN)_6]$), potassium ferrooxalate ($K_2[Fe(C_2O_4)_2]$), or iron(II) acetate tetrahydrate ($(CH_3COO)_2Fe \cdot 4H_2O$), ferrous lactate dihydrate, ferrous lactate trihydrate, urea ($CO(NH_2)_2$), compounds thereof, or mixtures thereof, and the nitrogen source is has an oxidation state of −3.

In another embodiment, the nitrogen source is one or more of urea or dicyandiamide.

In another embodiment, calcining is performed at a temperature of about 850° C. to about 1050° C. in a $N_2$ atmosphere.

In another embodiment the oxidizing is required and is performed.

In another embodiment, doping the precursor activated carbon is performed in a single stage process, the single stage process including a single step of contacting the precursor activated carbon with both an iron source and a nitrogen source.

In another embodiment, contacting the precursor activated carbon with the iron source and the nitrogen source is performed with a single aqueous solution that contains both the iron source and the nitrogen source.

In another embodiment, the precursor activated carbon is dried after it is contacted with the single aqueous solution containing the iron source and the nitrogen source.

In another embodiment, the iron source is iron(III) chloride hexahydrate ($FeCl_3 \cdot 6H_2O$) and the nitrogen source is one or more of urea or dicyandiamide (DCD).

In another embodiment, calcining is performed at a temperature of about 400° C. to about 1050° C. in a $N_2$ atmosphere.

In another embodiment, calcining is performed at a temperature of about 400° C. to about 600° C. in a $N_2$ atmosphere.

In another embodiment, calcining is performed at a temperature of about 850° C. to about 1050° C. in a $N_2$ atmosphere.

In another embodiment, the optional oxidizing is not performed.

In another embodiment, the optional oxidizing is required and is performed.

In one embodiment, there is a method of removing chlorine, chloramine, or both chlorine and chloramine from a fluid, the method comprising: providing a sorbent material, the sorbent material being formed from a carbonaceous material that is activated to form a precursor activated carbon, the sorbent material comprising at least about 1.3 wt. % nitrogen as measured on a dry precursor activated carbon basis; at least about 1,000 mg/kg of iron as measured on a dry precursor activated carbon basis; and wherein the sorbent material has a volumetric chloramine removal amount of about 70 mg/mL or more when measured with a stream of water that contacts the sorbent material, and contacting the sorbent material with a fluid.

In another embodiment, the fluid is liquid water.

In another embodiment, the water or the sorbent material has previously undergone a disinfecting step.

DRAWINGS

Aspects, features, benefits, and advantages of the embodiments described herein will be apparent with regard to the following description, appended claims, and accompanying drawings, where:

FIG. 2 depicts a process in accordance with an embodiment.

FIG. 3 depicts a process in accordance with an embodiment.

DETAILED DESCRIPTION

Figure 1:
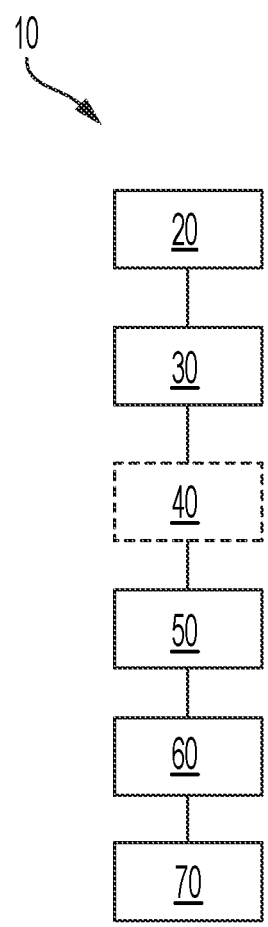
FIG. 1 depicts a process in accordance with an embodiment.

This disclosure is not limited to the particular systems, devices and methods described, as these may vary. The terminology used in the description is for the purpose of describing the particular versions or embodiments only and is not intended to limit the scope of the invention. Furthermore, as described herein, any listing of a patent document such as a U.S. Patent, U.S. Patent Application Publication, World Intellectual Property Organization publication, or foreign patent application publication means that such document is incorporated by reference in its entirety.

As used in this document, the singular forms "a," "an," and "the" include plural references unless the context clearly dictates otherwise. Unless defined otherwise, all technical and scientific terms used herein have the same meanings as commonly understood by one of ordinary skill in the art. Nothing in this disclosure is to be construed as an admission that the embodiments described in this disclosure are not entitled to antedate such disclosure by virtue of prior invention. As used in this document, the term "comprising" means "including, but not limited to."

As used herein, the term "about" means plus or minus 10% of the numerical value of the number with which it is being used. Therefore, about 50% means in the range of 45%-55%.

As used herein, the term "sorbent material" means any material that exhibits adsorbent properties, absorbent properties, or a combination of adsorbent properties and absorbent properties. Adsorbent properties mean that atoms, ions, or molecules adhere to the surface of the material. Absorbent properties means that atoms, ions, or molecule enter and are retained by a bulk phase of the material. By way of example, sorbent materials include activated carbon, reactivated carbon, natural and synthetic zeolite, silica, silica gel, alumina, zirconia, and diatomaceous earths. As used herein, "sorbent material" is a material whose constituent components are substantially adsorbent and/or absorbent, with only minimal components that are not adsorbent and/or absorbent (for example, the minimal amount of binder that is required for activated carbon pellets to maintain their shape).

As used herein, the term "sorbent" means any composition or composite that includes a sorbent material in a blend, mixture, composite, or compound with one or more additional materials that do not exhibit adsorbent properties. By way of example, one embodiment of sorbent includes an activated carbon sorbent material mixed with a thermally conductive filler.

As used herein, the term "carbonaceous material" means a material that contains carbon that has not been thermally activated or chemically activated. Carbonaceous material may have been mechanically treated, thermally treated, or chemically treated, and can even have weakly sorbent properties, but carbonaceous material does not adsorb compounds in substantial amounts as would be expected of a material such as activated carbon. Examples of carbonaceous material include but are not limited to bituminous coal, sub-bituminous coal, lignite coal, anthracite coal, wood, wood chips, sawdust, peat, nut shells, pits, coconut shell, babassu nut, macadamia nut, dende nut, peach pit, cherry pit, olive pit, walnut shell, wood, lignin, polymers, nitrogen-containing polymers, resins, petroleum pitches, bagasse, rice hulls, corn husks, wheat hulls and chaff, graphenes, carbon nanotubes, or polymer fibers.

As used herein, the term "disinfection byproduct" means a compound that is formed as a result of chemical reactions between organic and inorganic matter found in water and the chemical compounds that are used during the disinfection process, or a compound that is formed as a result of the irradiation of organic and inorganic matter found in water by ultraviolet radiation. Examples of disinfection byproducts include one or more of chlorine, chloramines, chloroform, trihalomethanes, haloacetic acids, and hydrogen peroxides.

As used herein, the term "macropores" means pores within a sorbent that are greater than about 50 nm in diameter.

As used herein, the term "mesopores" means pores within a sorbent that have a diameter of about 2 nm to about 50 nm.

As used herein, the term "micropores" means pores within a sorbent that have a diameter of less than about 2 nm.

As used herein, "chloramine" means one or more of mono-chloramine ($NH_2Cl$), di-chloramine ($NHCl_2$), or tri-chloramine ($NCl_3$).

As used herein, "iodine number" refers to either a gravimetric iodine number or a volumetric iodine number. The iodine number is a measure of the equilibrium mass of iodine adsorbed on the surface of a normalized amount of sorbent or sorbent material. The iodine number is a measure of the surface area and porosity of a sorbent or sorbent material.

As used herein, "gravimetric iodine number" means the property of a sorbent or sorbent material that is formed from carbonaceous material as determined by the industry standard test ASTM D4607-14. Gravimetric iodine number is reported in units of mass of iodine adsorbed per mass of sorbent or sorbent material.

As used herein, the term "volumetric" when used in conjunction with a property of a sorbent material means the product of the gravimetric measurement of that property multiplied by the apparent density of the sorbent or sorbent material As an example and as used herein, "volumetric iodine number" means the product of the gravimetric iodine number and the apparent density of the sorbent or sorbent material. The apparent density of the sorbent or sorbent material is obtained by the industry standard test ASTM D2854-09 (2019). The gravimetric iodine number has the meaning described in the preceding paragraph. The volumetric iodine number is reported in units of mass of iodine adsorbed per volume of sorbent or sorbent material.

The sorbents or sorbent materials described herein are useful for removing chloroforms and other similar volatile organic chemical compounds (VOC) from fluids such as water. The VOC are not limited and include one or more of styrene, alachlor, atrazine, benzene, carbofuran, carbon tetrachloride, chlorobenzene, chloropicrin, 2,4-dichlorophenoxyacetic acid (2,4-D), dibromochloropropane (DBCP), o-dichlorobenzene, p-dichlorobenzene, 1,2-dichloroethane, 1,1-dichloroethylene, cis-1,2-dichloroethylene, trans-1,2-dichloroethylene, 1,2-dichloropropane, cis-1,3-dichloropropylene, dinoseb, endrin, ethylbenzene, ethylene dibromide (EDB), haloacetonitriles (HAN) including bromochloroacetonitrile, dibromoacetonitrile, dichloroacetonitrile, and trichloroacetonitrile, haloketones (HK) including 1,1-dichloro-2-propanone and 1,1,1-trichloro-2-propanone, heptachlor (H-34, Heptox), heptachlor epoxide, hexachlorobutadiene, hexachlorocyclopentadiene, lindane, methoxychlor, pentachlorophenol, simazine, styrene, 1,1,2,2-tetrachloroethane, tetrachloroethylene, toluene, 2,4,5-TP (silvex), tribromoacetic acid, 1,2,4-trichlorobenzene, 1,1,1-trichloroethane, 1,1,2-trichloroethane, trichloroethylene, trihalomethanes including chloroform, bromoform, bromodichloromethane, chlorodibromomethane, or xylene. VOC that are relevant in the field of drinking water are known in the industry and are described, for example, in NSF/ANSI 53-2019, which was designated a standard on May 6, 2019 and which is incorporated by reference in its entirety. In some instances, the removal of VOC by sorbents or sorbent materials is measured by the removal of the individual VOC species themselves. In other embodiments, the removal of VOC by sorbents or sorbent materials is measured by the removal of surrogate compounds. Surrogates are compounds that are similar in chemical composition to the analytes of interest and which are present in sample prior to preparation and analysis. For example, chloroform is one example of a surrogate for the compounds of this paragraph.

The sorbents or sorbent materials described herein are also useful for removing other contaminants from water or other fluids such as perfluoroalkyl and polyfluoroalkyl substances (PFAS). The PFAS compounds include one or more of perfluorooctanoic acid (PFOA), perfluorooctanesulfonic acid (PFOS), and compounds produced by the GENX process such as 2,3,3,3,-tetrafluoro-2-(heptafluoropropoxy)propanoate and heptafluoropropyl 1,2,2,2-tetrafluoroethyl ether.

The sorbents or sorbent materials are also useful in removing a wide variety of emerging contaminants from water or other fluids. Such emerging contaminants include one or more of meprobamate, phenytoin, atenolol, carbamazepine, tris(2-chloroethyl)phosphate (TCEP), tris(1-chloro-2-propyl)phosphate (TCPP), N,N-diethyl-meta-toluamide (DEET), metolachlor, trimethoprim, ibuprofen, naproxen, estrone, bisphenol A, linuron, or nonyl phenol. Emerging contaminants that are relevant in the field of drinking water are known in the industry and are described, for example, in NSF/ANSI 401-2017, which was designated a standard on Jan. 12, 2017 and which is incorporated by reference in its entirety. In some instances, the removal of emerging compounds by sorbents or sorbent materials is measured by the removal of the individual emerging contaminants species themselves.

One embodiment of the overall process 10 of the disclosure is shown in FIG. 1. In FIG. 1, a carbonaceous material is provided 20, followed by activating 30 the carbonaceous material to form a precursor activated carbon. The precursor activated carbon is optionally oxidized 40, which means that in certain embodiments oxidation 40 is performed, but in certain other embodiments oxidation 40 is not performed. After the oxidation 40, the precursor activated carbon is doped 50 which imparts a quantity of iron dopants and nitrogen dopants to the precursor activated carbon and thereby produce a doped precursor activated carbon. The doped precursor activated carbon is then calcined 60 by heating under at specified temperatures and under a specified atmosphere and cooled 70 in an inert atmosphere so as not to substantially alter the pore structure or cause any substantial oxidation or activation of the doped precursor activated carbon. The completion of calcination 60 and cooling 70 produces the sorbent material of the disclosure.

Carbonaceous Material Processing

The disclosure provides one or more carbonaceous materials that are precursors to the final sorbents. Carbonaceous material may have been mechanically treated, thermally treated, or chemically treated, and can even have weakly sorbent properties, but carbonaceous material does not adsorb compounds in substantial amounts as would be expected of a material such as activated carbon. Additionally, although the carbonaceous materials may have been mechanically treated, thermally treated, or chemically treated, they have not been treated in ways that activate the carbon. Examples of carbonaceous material include but are not limited to bituminous coal, sub-bituminous coal, lignite coal, anthracite coal, wood, wood chips, sawdust, peat, nut shells, pits, coconut shell, babassu nut, macadamia nut, dende nut, peach pit, cherry pit, olive pit, walnut shell, wood, lignin, polymers, nitrogen-containing polymers, resins, petroleum pitches, bagasse, rice hulls, corn husks, wheat hulls and chaff, graphenes, carbon nanotubes, or polymer fibers.

In certain embodiments, the carbonaceous material is coconut. Coconut carbonaceous materials are particularly useful because when coconut is activated to form activated carbon, it has excellent adsorption of chloroform and other organic compounds.

After the carbonaceous material is provided, it is processed. Certain processing steps are not limited. Those steps that are not limited depend on the kind of the carbonaceous material and also the desired form of the final activated carbon, and the steps include one or more of pyrolysis of the carbonaceous material to form a charcoal, pulverizing the charcoal, mixing a binder with the pulverized charcoal, briquetting the pulverized charcoal and binder, crushing the briquettes, sizing the crushed briquettes, and baking the sized briquettes or the briquettes themselves to carbonize, cure, or remove the binder. However, in all instances, the carbonaceous material in the form of baked briquettes or sized particles is thermally activated, chemically activated, or thermally and chemically activated. Thermal activation is performed by heating the baked briquettes or sized particles in the presence of one or more of water, oxygen, and carbon dioxide. Chemical activation is performed by impregnating the baked briquettes or sized particles in the presence of a strong acid, strong base, or a salt.

The result of processing the carbonaceous material is that activated carbon is formed. As described herein, this activated carbon will be referred to as "precursor activated carbon" as subsequent disclosure describes additional steps that will be applied to the precursor activated carbon to further improve its performance. The performance of the precursor activated carbon depends on several factors, including the kind and amount of one or more carbonaceous materials that are included, the type of activation including chemical or thermal activation, and the level of activation that is imparted to the carbonaceous material to thereby form the precursor activated carbon. Performance of the precursor activated carbon is also affected by other processing steps such as the crushing and sizing of reagglomerated carbonaceous material particles, the level of residual binder, and the final size of the precursor activated carbon.

In all embodiments, the precursor activated carbon is not separately treated or oxidized beyond the steps outlined above. Thus, the sorbent capacity with respect to different disinfection byproducts or other contaminant species is substantially because the adsorptive capacity of the precursor activated carbon itself is maintained and is not particularly dependent on catalytic effects. In certain embodiments, the precursor activated carbon retains substantially all organic compound adsorption capability including adsorption of chloroform, VOCs, PFAS, and emerging contaminants because of the internal pore structure of the precursor activated carbon.

Oxidation of Precursor Activated Carbon

The disclosure contemplates optional oxidation of the precursor activated carbon. In certain embodiments, the precursor activated carbon is oxidized after it is activated. In other embodiments, the precursor activated carbon is not oxidized after it is activated. Oxidation of the precursor activated carbon means that the precursor activated carbon is exposed to oxygen molecules at temperatures sufficient to impart oxygen species or complexes on the surface of the activated carbon. Oxidation does not contemplate substantial modification of the pore structure of the precursor activated carbon.

For example, in some embodiments, oxidation is performed by exposing the feedstock to an oxygen containing environment and heating the feedstock to a temperature of about 150° C. to about 1050° C. The temperature of oxidizing can be about 150° C. to about 250° C., about 250° C. to about 350° C., about 350° C. to about 450° C., about 450° C. to about 550° C., about 550° C. to about 650° C., about 650° C. to about 750° C., or about 750° C. to about 850° C., or any of those disclosed endpoints, or any range that is made of a combination of any of the above ranges or values within those ranges. In different embodiments, the oxygen containing environment is one or more of atmospheric air, oxygen gas ($O_2$), oxygen plasma, hydrogen peroxide ($H_2O_2$), ozone ($O_3$), nitrous oxide ($N_2O$), or carbon dioxide ($CO_2$).

In some embodiments, the oxygen containing environment is dry, and includes no moisture or substantially no measurable moisture. The selection of the oxidizing temperature and the oxidant and oxidizing process does not substantially modify the pore structure of the precursor activated carbon. Thus, if a more oxidizing oxygen containing environment is selected, temperatures must be lowered to reduce the potential that additional activation will occur. Alternatively, if a higher temperature is selected, a less oxidizing oxygen containing environment must be selected to reduce the potential that additional activation will occur.

Oxidation can also be accomplished electrochemically. It should be noted that carbons slowly oxidize in the presence of air with or without moisture at room temperature and this oxidation, although slow, would eventually be sufficient to produce an oxidized carbon precursor. Alternately, the carbon may be oxidized in a non-thermal process using hydrogen peroxide, ozone, chlorine, persulfates, percarbonates, oxidizing acids such as nitric acid, air, pure oxygen or any combination thereof in the liquid or vapor phase at temperatures less than about 100° C. In some embodiments, the oxidizing step is omitted, i.e., the sorbent feedstock is not oxidized by any step faster than the above described slow oxidation that takes place naturally at room temperature under normal conditions.

Fe—N Doping

After the precursor activated carbon is prepared and optionally oxidized, the precursor activated carbon is further treated by doping with iron-nitrogen (Fe—N) compounds. Doping with Fe—N imparts Fe—N complexes on the surface of the precursor activated carbon, thereby serving to catalyze disinfection byproducts. Doping is achieved by contacting the precursor activated carbon with at least one iron source and at least one nitrogen source. Alternatively, doping is achieved by contacting the precursor activated carbon with a single compound that serves as both an iron source and a nitrogen source.

The iron source, nitrogen source, or single source of iron and nitrogen is not limited, and includes one or more of iron(III) chloride hexahydrate ($FeCl_3 \cdot 6H_2O$), iron(II) chloride tetrahydrate ($FeCl_2 \cdot 4H_2O$), ammonium iron(III) sulfate dodecahydrate ($NH_4Fe(SO_4) \cdot 12H_2O$), iron(II) sulfate heptahydrate ($Fe_2SO_4 \cdot 7H_2O$), ammonium iron(III) oxalate trihydrate ($(NH_4)_3Fe(C_2O_4)_3 \cdot 3H_2O$), ammonium hexacyanoferrate(II) hydrate ($(NH_4)_4[Fe(CN)_6] \cdot xH_2O$), ammonium iron(III) citrate ($(NH_4)_5[Fe(C_6H_4O_7)_2]$), sodium ferrocyanide decahydrate ($Na_4Fe(CN)_6 \cdot 10H_2O$), sodium ferrioxalate ($Na_3Fe(C_2O_4)_3$), potassium ferrocyanide trihydrate ($K_4[Fe(CN)_6] \cdot 3H_2O$), potassium ferricyanide ($K_3[Fe(CN)_6]$), potassium ferrooxalate ($K_2[Fe(C_2O_4)_2]$), iron(II) acetate tetrahydrate ($(CH_3COO)_2Fe \cdot 4H_2O$), ferrous lactate dehydrate, ferrous lactate trihydrate, urea ($CO(NH_2)_2$), dicyandiamide (DCD), mixtures thereof, compounds thereof, or combinations thereof. It is further contemplated that each of the above listed compounds can be provided in hydrous or anhydrous form. In some embodiments, the iron source, nitrogen source, or single source of iron and nitrogen is provided as part of an aqueous solution. It should be noted that anhydrous iron salt precursors, including $FeCl_3$ and $FeCl_2$, are analogous to hydrated counterparts including $FeCl_3 \cdot 6H_2O$ and $FeCl_2 \cdot 4H_2O$ for the doping process.

While the above description of the nitrogen source or the single source of iron and nitrogen includes several listed compounds, the nitrogen source or the single source of iron and nitrogen are not so limited. In particular, Applicants discovered that those nitrogen compounds that have an oxidation state of −3 provided resulted in excellent performance. Therefore, in some embodiments, the nitrogen source is not limited so long as the nitrogen source has an oxidation state of −3.

The doping process is not limited. In some embodiments, doping is performed in a single stage. In a single stage process, the precursor activated carbon is treated by contacting it with a single solution, and that single solution includes both the iron compounds and the nitrogen compounds, or the single solution includes a single source of iron and nitrogen. For example, in one embodiment, the doping is performed in a single stage by contacting the precursor activated carbon with an aqueous solution containing iron(III) chloride hexahydrate and urea. In another embodiment, the doping is performed in a single stage by contacting the precursor activated carbon with an aqueous solution containing iron(III) chloride hexahydrate and dicyandiamide.

In the single stage process of doping the precursor activated carbon, the amount of iron compounds and the amount of nitrogen compounds that are doped can be controlled by one or more of varying the concentration of the iron compound in solution, varying the concentration of nitrogen concentration in solution, varying the amount of time that the solution contacts the precursor activated carbon, or varying the temperature of the solution.

After doping is achieved with solution in the single stage process, the precursor activated carbon is dried to remove water or other solvent, with the iron and nitrogen compounds thereby remaining on the precursor activated carbon. The process of drying is not limited and is performed by drying in air at about 100° C. to about 150° C. for up to 2 hours.

Following the single stage process, the resultant doped and dried precursor activated carbon includes iron and nitrogen in various amounts. For example, the amount of iron that is added when measured on a dry precursor activated carbon basis is about 0.1 wt. %, about 0.2 wt. %, 0.3 wt. %, about 0.4 wt. %, about 0.5 wt. %, about 0.6 wt. %, about 0.7 wt. %, about 0.8 wt. %, about 0.9 wt. %, about 1.0 wt. %, about 1.1 wt. %, about 1.2 wt. %, about 1.3 wt. %, about 1.4 wt. %, about 1.5 wt. %, about 1.6 wt. %, about 1.7 wt. %, about 1.8 wt. %, about 1.9 wt. %, about 2.0 wt. %, about 2.1 wt. %, about 2.2 wt. %, about 2.3 wt. %, about 2.4 wt. %, about 2.5 wt. %, about 2.6 wt. %, about 2.7 wt. %, about 2.8 wt. %, about 2.9 wt. %, about 3.0 wt. %, about 3.1 wt. %, about 3.2 wt. %, about 3.3 wt. %, about 3.4 wt. %, about 3.5 wt. %, about 3.6 wt. %, about 3.7 wt. %, about 3.8 wt. %, about 3.9 wt. %, about 4.0 wt. %, about 4.1 wt. %, about 4.2 wt. %, about 4.3 wt. %, about 4.3 wt. %, about 4.4 wt. %, about 4.5 wt. %, or any range that includes one or more of the above values as endpoints. The amount of nitrogen when measured on a dry precursor activated carbon basis is about 1.5 wt. %, about 2.0 wt. %, about 2.2 wt. %, about 2.5 wt. %, about 3.0 wt. %, about 3.5 wt. %, about 4.0 wt. %, about 4.5 wt. %, about 5.0 wt. %, about 5.5 wt. %, about 6.0 wt. %, about 6.5 wt. %, about 7.0 wt. %, about 7.5 wt. %, about 8.0 wt. %, about 8.3 wt. %, about 8.5 wt. %, about 9.0 wt. %, about 9.5 wt. %, about 10.0 wt. %, about 10.5 wt. %, about 11.0 wt. %, about 11.5 wt. %, about 12.0 wt. %, about 12.5 wt. %, about 13.0 wt. %, about 13.5 wt. %, about 14.0 wt. %, about 14.5 wt. %, about 15.0 wt. %, about 15.5 wt. %, about 16.0 wt. %, about 16.5 wt. %, about 16.7 wt. %, about 17.0 wt. %, about 17.5 wt. %, about 18.0 wt. %, about 18.5 wt. %, about 19.0 wt. %, about 19.5 wt. %, about 20.0 wt. %, or any range that includes one or more of the above values as endpoints.

FIG. 2 shows one embodiment of the doping process 50 in a single stage configuration. In the doping process 50, the precursor activated carbon is contacted with an aqueous solution containing an iron source and a nitrogen source, shown by box 51. Next, the contacted precursor activated carbon is dried 52. After drying, doped precursor activated carbon is ready for calcining.

In another embodiment of the single stage process, the precursor activated carbon is provided and subsequently sprayed with an aqueous solution that includes dissolved urea and iron(III) chloride hexahydrate dopants. The precursor activated carbon then stands for a predetermined period of time. After standing, the precursor activated carbon is dried for a predetermined period of time and at a predetermined temperature. By way of example, the aqueous solution adds about 12.1 wt. % N and about 0.19 wt. % Fe, with each measured against the weight of the dry precursor activated carbon. Additionally, the standing time can be about 40 minutes, about 50 minutes, about 60 minutes, about 70 minutes, or about 80 minutes. Drying is performed at a temperature of about 100° C. for about 4 hours, though the drying is not limited and these times and temperatures can vary. Once the drying step is completed, the doped precursor activated carbon is ready for calcining.

In an alternative embodiment, doping is performed in a two stages. In a two stage process, the precursor activated carbon is treated by first contacting it with a solution that contains iron, optionally drying the precursor activated carbon containing iron, second contacting the precursor activated carbon containing iron with a solution that contains nitrogen, and drying the precursor activated carbon that contains iron and nitrogen. In one such embodiment, the doping is performed in two stages by first contacting the precursor activated carbon with an aqueous solution containing dissolved iron(III) chloride hexahydrate and second contacting the precursor activated carbon with an aqueous solution of urea. In another embodiment, the two stage doping is performed by first contacting the precursor activated carbon with an aqueous solution of dissolved iron(III) chloride hexahydrate and second contacting the precursor activated carbon with an aqueous solution of dicyandiamide.

In the two stage process of doping the precursor activated carbon, the amount of iron compounds and the amount of nitrogen compounds that are doped can be controlled by one or more of varying the concentration of the iron compound in solution, varying the concentration of nitrogen concentration in solution, varying the amount of time that one or more of the solution containing iron or the solution containing nitrogen contacts the precursor activated carbon, or varying the temperature of one or more of the solution containing iron or the solution containing nitrogen.

Following the two stage process, the resultant doped and dried precursor activated carbon includes iron and nitrogen in specified amounts. For example, the amount of iron when measured on a dry precursor activated carbon basis is about 0.05 wt. %, about 0.10 wt. %, about 0.19 wt. %, about 0.20 wt. %, about 0.25 wt. %, about 0.30 wt. %, about 0.35 wt. %, about 0.40 wt. %, about 0.45 wt. %, about 0.50 wt. %, about 0.6 wt. %, about 0.7 wt. %, about 0.8 wt. %, about 0.9 wt. %, about 1.0 wt. %, about 1.1 wt. %, about 1.2 wt. %, about 1.3 wt. %, about 1.4 wt. %, about 1.5 wt. %, about 1.6 wt. %, about 1.7 wt. %, about 1.8 wt. %, about 1.9 wt. %, about 2.0 wt. %, or any range that includes one or more of the above values as endpoints. The amount of nitrogen when measured on a dry precursor activated carbon basis is about 1.5 wt. %, about 2.0 wt. %, about 2.2 wt. %, about 2.5 wt. %, about 3.0 wt. %, about 3.5 wt. %, about 4.0 wt. %, about 4.5 wt. %, about 5.0 wt. %, about 5.5 wt. %, about 6.0 wt. %, about 6.5 wt. %, about 7.0 wt. %, about 7.5 wt. %, about 8.0 wt. %, about 8.3 wt. %, about 8.5 wt. %, about 9.0 wt. %, about 10 wt. %, about 15 wt. %, about 20 wt. %, about 25 wt. %, about 26 wt. %, about 30 wt. %, about 35 wt. %, or any range that includes one or more of the above values as endpoints.

FIG. 3 shows one embodiment of the doping process 50 in a two stage configuration. In the doping process 50, the precursor activated carbon is contacted with an aqueous solution containing an iron source, shown by box 51. Next, precursor activated carbon is dried 52. After drying 52, the precursor activated carbon is contacted with an aqueous solution containing a nitrogen source, shown by box 53. After contacting with the nitrogen source containing aqueous solution, the precursor activated carbon is dried 54. After this second drying step, the doped precursor activated carbon is ready for calcining.

While both the single stage and the two stage Fe—N doping processes are disclosed above, the processes are not so limited. For example, additional dopants can be applied in additional stages or as part of any of the solutions that contact the precursor activated carbon.

Thermal Processing/Calcination

After the completion of one or more of the single stage and two stage Fe—N doping processes, the doped precursor activated carbon is ready for thermal processing, which is also referred to as calcination. During calcination, the doped precursor activated carbon is heated in the presence of an inert atmosphere to achieve additional changes in the doped precursor activated carbon.

The temperature of calcination of the doped precursor activated carbon is not limited. In some embodiments, calcination takes place at a temperature of about 400° C., about 450° C., about 500° C., about 550° C., about 600° C., about 650° C., about 700° C., about 750° C., about 800° C., about 850° C., about 900° C., about 950° C., about 1000° C., about 1050° C., or any range that includes one or more of the above values as endpoints.

The inert atmosphere for calcination is one that does not cause any substantial oxidation or activation of the doped precursor activated carbon at the specified temperatures so as not to alter the pore structure of the doped precursor activated carbon. Thus, in many embodiments, the atmosphere contains no oxygen, carbon dioxide, or water, or the atmosphere contains amounts of oxygen, carbon dioxide, or water that are so small as to not cause any oxidation or activation. Examples of atmospheres for calcination include one or more of nitrogen gas ($N_2$), helium, neon, argon, krypton, xenon, radon, and combinations thereof.

After calcination is completed, the calcined doped precursor activated carbon is cooled. During the cooling step, the calcined doped precursor activated carbon is contacted by an inert atmosphere. In some embodiments, the inert atmosphere that is used during the cooling step is the same as that used during the calcination step. In other embodiments, the inert atmosphere that is used during the cooling step is different than the inert atmosphere that is used during the calcining step. Examples of atmospheres for cooling the calcined doped precursor activated carbon include one or more of nitrogen gas ($N_2$), helium, neon, argon, krypton, xenon, radon, and combinations thereof. When calcination and cooling are complete, the resultant product is referred to as sorbent material.

In some embodiments, the sorbent material is granular activated carbon (GAC), which is defined as activated carbon particles sized to be retained on a 50-mesh sieve (holes of about 0.300 mm). In other embodiments, the sorbent material is powdered activated carbon (PAC), which is defined as particles that pass through an 80-mesh sieve (holes of about 0.180 mm). While these particle size ranges are mentioned for activated carbon sorbent materials, it is also contemplated that any of the disclosed sorbent materials may be measured by the above 50-mesh and 80-mesh sieve sizes. In still other embodiments, the sorbent material is pelletized activated carbon.

Performance Measurement/Sorbent Characterization

The performance of the sorbent materials of the disclosure is measured in various ways, including the "chloramine destruction number" (CDN) which defined below. The chloramine destruction number quantifies the amount of chloramine that can be removed from a fluid by the sorbent materials of the disclosure. The measurement of the CDN is known in the art, for example in U.S. Patent Application Publication 2018/0229217 published on Aug. 15, 2018 and titled "CHLORAMINE AND CHLORINE REMOVAL MATERIAL AND METHODS FOR MAKING THE SAME," which is incorporated by reference herein in its entirety.

The CDN is the absolute value of the first order linear kinetic fit, multiplied by 1000, that is applied to a natural log of a concentration of chloramine in water versus time, where the initial concentration of chloramine is decreased over a period of 150 minutes. When ammonia is in equilibrium with chlorine in solution the form of chloramine is pH dependent. The chloramine solution comprised ammonium chloride; sodium hypochlorite and deionized water were mixed to obtain a 1 L solution of 300 ppm chloramine at a pH of 9.0. At a pH value of 9.0, the chloramine species that is present at equilibrium is the mono-chloramine form, which is the most difficult to destroy. The solution was buffered using sodium carbonate to maintain the solution pH during evaluation. The chlorine solution comprised sodium hypochlorite and deionized water to obtain 1 L of a 300 ppm chlorine solution. One liter of the 300 ppm respective solution was added to an Erlenmeyer flask that was placed in a water bath controlled to 20° C. A constant volume of 2.0 mL activated carbon (sized at 80×325 mesh) was added to the agitated 1 L chloramine or chlorine solution for each sample analysis. The volume of the carbon used was determined from the apparent density of the 80×325 carbon as determined by ASTM Method D-2854. The concentration of total chlorine in solution was measured at various time points over a 150 min period by taking aliquots and then analyzing using a standard HACH colorimetric EPA accepted method 10070 for total chlorine. The concentration of chloramines was measured using the NSF/ANSI-42 (2015).

After a sorbent material is analyzed experimentally, the concentration versus time data for each sorbent material sample is replotted as the natural log of total chlorine concentration versus time to linearize the data according to first order kinetic theory. A linear fit is then applied to the data and the slope of the linear fit is determined. The slope is always negative because the initial concentration of total chlorine decreases over the 150 min period. As a result the absolute value of the slope multiplied by 1000 is used quantify the rate of chloramine and chlorine destruction (removal). The larger the absolute slope, the more effective the sorbent material is at removing chlorine and chloramine. For these measurements, the slope resulting from the linear fit of the first order kinetic experimental data (again multiplied by 1000) is referred to as the "chloramine destruction number" or CDN. In the case of chlorine destruction this rate is referred to as the "chlorine destruction number" of Cl-DN. These values quantify the amount of chloramine and/or chlorine which can be removed from water by the sorbent materials or sorbents of the disclosure.

For the CDN, the disclosure contemplates values of about 3.0, about 3.5, about 4.0, about 4.5, about 5.0, about 5.5, about 6.0, about 6.5, about 7.0, about 7.5, about 8.0, about 8.5, about 9.0, about 9.5, about 10.0, about 10.5, about 11.0, about 12.0, about 12.5, about 13.0, about 13.5, about 14.0, about 14.5, about 15.0, about 15.5, about 16.0, about 16.5, about 17.0, about 17.5, about 18.0, about, 18.5, about 19.0, about 19.5, about 20.0, about 20.5, about 21.0, about 21.5, about 22.0, about 22.5, about 23.0, about 23.5, about 24.0, about 24.5, about 25.0, about 25.5, about 26.0, about 26.5, about 27.5, about 28.0, about 28.5, about 29.0, about 29.5, about 30.0, about 35.0, about 40.0, about 45.0, about 50.0, about 55.0, about 60.0, about 65.0, about 70.0, about 75.0, about 80.0, about 85.0, about 90.0, about 95.0, about 100.0, about 105.0, about 110.0, about 115.0, about 120.0, about 125.0, about 130.0, about 135.0, about 140.0, about 145.0, about 150.0, or any range that includes at least two of these values as the endpoints. Alternatively, the CDN can be a range within these numbers as a lower performance bound, such as at least about 4.0, at least about 4.5, at least about 5.0, at least about 10.0, at least about 15.0, at least about 20.0, at least about 23.0, at least about 50.0, at least about 75.0, or at least about 100.0. In some embodiments, the chloramine destruction number is measured with respect to mono-chloramine.

In addition to chloramine, this disclosure is also effective at removing chlorine from fluids such as aqueous streams. The ability of the calcined activated carbon to remove chlorine was assessed as described above, however the test solution is made without the addition of ammonium chloride, and therefore the solution contains 300 ppm chlorine. Sorbent material particle size for chlorine analysis was 95% at about 325 mesh. The analysis of the chlorine concentration versus time data and the corresponding first order kinetic slope remains the same, however, and the slope of the linear fit of this data is referred to as the "chlorine destruction number" or Cl-DN.

To determine the performance of the sorbent material for removing chloramine, the following test procedure was used. First, the sorbent material sample was crushed so that $d_{50}$ is about 8 μm. The now milled and separated sorbent material sample is dried at 115° C. for 2 hours and allowed to cool in a desiccator. Additionally, a first solution is prepared containing 0.225 g of ammonium chloride per 0.5 L of distilled water was prepared, and to that solution 0.188 g of sodium carbonate ($Na_2CO_3$) is added. A second solution is prepared by adding 0.75 mL of a 10% solution of sodium hypochlorite (NaOCl) in distilled water to 0.5 mL of distilled water. The first solution and the second solution are mixed to form a Standard Chloramine Solution.

The milled and dried sorbent material sample is weighed and placed in a vial container along with 100 mL of the Standard Chloramine Solution. The vial container is then shaken at 25° C. for 2 hours in a shaker. After the shaking is complete, the carbon and solution are separated by a filter and the resultant filtrate is analyzed.

Analysis of the filtrate is as follows. First, the concentration of free chlorine is measured by absorption spectrometer (553 nm wavelength). During this step, 9.5 mL of filtrate is agitated in 0.5 mL DPD1 phosphate buffered solution and 0.1 mL DPD2 reagent (N,N-diethyl-p-phenylenediamine). Second, the concentration of residual chlorine is measured. During this step, 9.5 mL of filtrate is agitated in 0.5 mL DPD1 solution and 0.1 g DPD2 reagent. After the agitation, 0.1 g DPD-3 reagent (potassium iodide) is added, and the resultant mixture is agitated. Next, the solution sits without shaking for 2 minutes, and finally a measurement is performed by absorption spectrometer (553 nm wavelength). The concentration of chloramine is determined by Formula 1, where A is the concentration of residual chlorine in ppm, B is the concentration of free chlorine in ppm, and C is the concentration of chloramine:

$$A-B=C \tag{1}$$

Using the same procedure as above, an isotherm is formed by varying the weight of the carbon sample. For this, chloramine adsorption amount is determined in mg of chloramine adsorbed per g of sorbent material sample. The adsorption isotherm is formed by the following general formula, where $C_1$ is a raw water concentration obtained according to Formula 1, $C_2$ is a treated water concentration after 2 hours obtained according to Formula 1, and D is the weight of sorbent material sample measured in mg.

$$(C_1-C_2) \times 0.1 L/D \times 1000 \tag{2}$$

From the adsorption isotherm, the adsorption amount is determined in units of mg chloramine per g of sorbent material, and it is determined for 3 ppm of concentration of chloramine in water. From this test, a higher value corresponds to a higher performing sorbent material.

To determine the performance of the sorbent material for removing volatile organic compounds (VOCs) such as chloroform, the following test procedure was used. First, the sorbent material sample was milled so that more than 90% of the particles pass through a 330 mesh screen. The now milled and separated sample is dried at 115° C. for 2 hours and allowed to cool in a desiccator. Additionally, 100 parts per billion (ppb) chloroform water solution is prepared. The milled and dried sorbent material sample is weighed and placed in 100 mL vial containers. Using a whole pipette, 100 mL of the 100 ppb chloroform water solution is measured and is placed into each of the vial containers. Each of the individual vial containers are sealed by placing a sheet of polytetrafluoroethylene (PTFE) on the opening of the container, placing a butyl cup on top of the PTFE sheet, placing an aluminum seal on top of the butyl cap, and completing the seal with a specially designed tool for the aluminum seal. The seal, when combined with the materials of the vial container, ensure that contents chloroform does not escape by diffusion or leakage.

After the vial container is sealed, it is placed in a shaker and shaken for 2 hours at 25° C. During shaking, the vial container is removed from the shaker and shaken vigorously by hand every 30 minutes to suppress sedimentation of the sorbent material. To determine the concentration of chloroform in the stock solution, a separate identical vial container that contains chloroform and water solution but not any sample sorbent material is prepared, weighed, and shaken in an identical manner.

After the shaking is complete, the aluminum seal is removed from the vial container so that the butyl cap and PTFE sheet remain on the container. Next, 10 µL of methanol is added to the water using a micro syringe to pierce the butyl cap. The vial container is next stored in a constant temperature bath at 25° C. for 1 hour. After the 1 hour has completed, 0.1 mL of head gas in the vial container is measured using a gas micro syringe and implanted in electron capture detector (ECD) gas chromatography to measure the residual chloroform concentration from the standard curve. In the same manner, the chloroform concentration of the separate, identical container that does not contain sorbent material sample is also measured.

Next, the amount of adsorption from the concentration of chloroform in the stock solution and the concentration of the residual chloroform are calculated, and the results are plotted on a double logarithmic graph. The amount of chloroform adsorbed at an equilibrium concentration of 10 ppb is read and is used as the amount of chloroform adsorbed, and the amount of is reported in the units of milligrams of chloroform adsorbed per gram of sorbent material sample (mg/g). The amount is calculated according to Formula 1, where A is the chloroform concentration (ppb), B is the residual chloroform concentration (ppb), and C is the sample size (g):

$$\text{adsorbed amount (mg/g)} = (A-B)/(C \times 10000) \quad (3)$$

The resulting adsorbed amount is reported in units of milligrams of chloroform adsorbed per gram of sorbent material sample (mg/g). From this test, a higher value corresponds to a higher performing sorbent material.

The "peroxide destruction number" which is also referred to as the "peroxide number" is also measured. The peroxide number is a volumetric test, which means that performance is measured and normalized to a specified volume of sorbent material. The test for the peroxide number is well known in the art, and is described by U.S. Pat. No. 5,470,748, which is incorporated by reference herein in its entirety.

During the test of the peroxide number, the sorbent material is first pulverized to a fine mesh size fraction where at least 90 wt. %, and in certain tests at least 95 wt. %, of the sorbent will pass through a 325 mesh U.S. Standard Series sieve (44 µm opening size). A specified amount of the pulverized sorbent material is placed in a vacuum flask (Dewar), and 100 mL of deionized water is added to the vacuum flask. The addition of the deionized water is performed such that any pulverized sorbent material clinging to the sides of the vacuum flask is carried into the main body of water at the bottom of the vacuum flask. Next, a 50 mL aliquot of aqueous buffer solution is added to the vacuum flask. The aqueous buffer solution is 0.5 molar in $K_2HPO_4$ and 0.5 molar in $KH_2PO_4$. After the aqueous buffer solution is added, a magnetic stir bar is added into the vacuum flask and energized to begin stirring. Stirring speed is increased until a vortex greater than about 0.5 inches (1.27 cm) deep is formed in the mixture and the optimum stir bar speed is achieved. The optimum stir bar speed is selected so that additional increases in stir bar speed do not significantly affect the peroxide decomposition time.

During the test of the peroxide number, a specified amount of sorbent material added to a buffered hydrogen peroxide solution. The amount of sorbent material that is added to the buffered hydrogen peroxide solution is based on one half (½) of its apparent density. In the buffered solution, the catalytic properties of the sorbent material cause the peroxide to be catalyzed and thereby destroyed (i.e., the hydrogen peroxide decomposes into water and oxygen gas).

The catalysis of hydrogen peroxide is exothermic. Thus, the rated of decomposition by way of the sorbent material can be approximated over time by measuring the temperature of the buffered solution. As used herein, the "peroxide number" is the length of time in minutes that is required for the buffered solution containing the sorbent material sample to reach 75% of the recorded maximum temperature. Faster times and therefore smaller values of the peroxide number indicate more catalytic activity and thus a higher performance sorbent material. In some embodiments, the peroxide destruction number measured in minutes is about 2.5, about 3.0, about 3.5, about 4.0, about 4.5, about 5.0, about 5.5, about 6.0, about 6.5, about 7.0, or any range that is formed from two or more of the above values as endpoints of the range. In some embodiments, the peroxide destruction number measured in minutes is about 10, about 15, about 20, about 25, about 30, about 35, about 40, about 45, or any range that is formed from two or more of the above values as endpoints of the range.

The peroxide number is related to and has some correlation with the CDN and C1-DN, in that each are measures of the catalytic activity of the sorbent material. However, the correlation is not always exact, because each represents a different aspect of the catalytic activity of a sorbent material. Still further, the catalytic activity is useful only for those compounds that are catalyzed, but other compounds must be adsorbed to be effectively removed from a fluid stream. A superior sorbent material therefore must have good performance in more than one of the CDN, C1-DN, peroxide number, and adsorption tests so that it is effective at removing a broad range of compounds from fluid streams.

Fluid Treatment

Further embodiments are directed to methods for purifying fluids such as water by using the chlorine and chloramine destroying sorbent materials described above. In one embodiment, a fluid is treated by flowing the fluid over a bed of sorbent material, introducing fluid onto a filter including sorbent material, introducing sorbent material into a container for holding fluid, and the like. In certain embodiments, the above steps are combined in parallel or subsequently in series. In certain embodiments, the fluid is water. In still other embodiments, the fluid is water that is for human, plant, animal, or marine life consumption. In some embodiments, the fluid is in liquid form.

In other embodiments, the methods of purifying fluids includes additional steps. For example, in some embodiments, methods for purifying includes the steps of filtering the fluid using, for example, a screen or sand filter before, after, or both before and after contacting with sorbent material to remove particulates. In further embodiments, the methods include a step of disinfecting the water to remove biological contaminants such as bacteria or other microorganisms, and in some embodiments, the methods include the step of introducing a disinfectant into the fluid or irradiating the fluid with ultraviolet radiation. In still further embodiments, the methods include the step of clarifying the fluid, adjusting the pH of the fluid, and the like and combinations thereof. In each of the above embodiments, the fluid can be water.

EXAMPLES

The following experimental examples are intended to better illustrate specific embodiments, and they are not intended to limit the disclosure.

Two Stage Process Examples

Coconut carbonaceous material was provided, processed and activated. The resultant coconut activated carbon is available from Kuraray Co., Ltd. under the product name GW-H, GW or GW-THM and is referred to as precursor activated carbon. The coconut activated carbon is a granular activated carbon and tested in the sizes of 10×30, 18×42, and 30×60. The activated carbon was oxidized. After oxidation, a two stage doping process was employed to dope the oxidized precursor activated carbon with iron and nitrogen.

In the first stage, an aqueous solution of $FeCl_3 \cdot 6H_2O$ contacts the precursor activated carbon to achieve 0.19 wt. % Fe on a dry precursor activated carbon basis. After the aqueous solution contacts the precursor activated carbon for 15 hours, the precursor activated carbon is dried in a first drying step. After the first drying step, an aqueous solution of urea contacts the activated carbon to achieve 12.1 wt. % N on a dry precursor activated carbon basis. Next, the precursor activated carbon is dries in a second drying step to thereby product the doped precursor activated carbon.

The doped precursor activated carbon undergoes calcination. During calcination, the doped precursor activated carbon is heated to 950° C. for a period of 1 hour under a pure $N_2$ atmosphere. The calcination step provides additional processing of the doped precursor activated carbon, which includes the Fe and N dopants that were applied to the precursor activated carbon during the doping step. The results of the two-stage process are demonstrated in Examples 42, 47, and 56-59.

Single Stage Process Examples

Coconut carbonaceous material was provided, processed and activated. The resultant coconut activated carbon is available from Calgon Carbon Corporation under the product name OLC and is referred to as precursor activated carbon. The coconut activated carbon is a granular activated carbon and tested in the sizes of 12×40. The precursor activated carbon is oxidized for some tests but is not oxidized for other tests. After the provision of the precursor activated carbon and, in some instances, the optional oxidation step, the precursor activated carbon is ready for doping with Fe and N.

During the Fe and N doping, a single stage doping process is performed. The single stage doping process dopes the oxidized or the unoxidized precursor activated carbon with iron and nitrogen. During the single stage doping process, an aqueous solution containing both $FeCl_3 \cdot 6H_2O$ Fe and DCD contacts the oxidized or unoxidized precursor activated carbon to achieve 0.5 wt. % to 1.0 wt. % Fe and 2.2 wt. % to 8.3 wt. % N on the carbon, measured on a dry precursor activated carbon basis. The aqueous solution contacts the precursor activated carbon for up to 30 minutes at 25° C. After the aqueous solution contacts the precursor activated carbon, the precursor activated carbon is dried to thereby produce a doped precursor activated carbon.

The doped precursor activated carbon is calcined. During calcination, the doped precursor activated carbon is heated under a pure $N_2$ atmosphere. Regarding the calcining step that is performed in Examples 1-36, if the precursor activated carbon was not oxidized, then the doped precursor activated carbon is heated to 500° C. to calcine the doped precursor activated carbon. Alternatively, if the precursor activated carbon of Examples 1-36 were oxidized, then the doped precursor activated carbon is heated to a temperature of 500° C. or 950° C. The calcination under pure $N_2$ atmosphere is performed for 1 hour. In Examples 1-36, the best chloramine performance was obtained by selecting a precursor activated carbon that is oxidized and calcining at 500° C. as shown by Example 17 which achieved a CDN value of 125.6. The results of performance testing of Examples 1-36 and Comparative Examples 1-16, 22-25, 34-37, 39, and 40 are also quantified.

Experimental Results

The treatment and experimental results of Examples 1-12 and Comparative Examples 1-10 are shown in Table 1. In each of Examples 1-12 and Comparative Examples 1-10, the precursor activated carbon is not oxidized. Examples 1-12 and Comparative Examples 1-10 were doped in a single stage process. In all of Examples 1-12 and Comparative Examples 1-10, any iron that is added is by way of an aqueous solution containing ferric chloride hexahydrate. If an Example or Comparative Example has 0.0 wt. % Fe added, then the sample was not contacted by aqueous solution containing ferric chloride hexahydrate or any other iron source. Calcination was always performed under $N_2$ atmosphere.

The results of Examples 1-12 and Comparative Examples 1-10 show that the combination of doped precursor carbon that was not previously oxidized, low processing temperatures of about 500° C., and selection of $FeCl_3$ and DCD as the dopant results in a sorbent material has very high CDN performance. For instance, Examples 2-5 which use unoxidized OLC precursor carbon are processed with these parameters and resulted in CDN values of at least about 24.2, which were higher than any other tested materials in Table 1. Similarly, Example 6 which uses unoxidized GW-THM precursor activated carbon and is also processed with these parameters resulted in a CDN value of 22.3. The results of Examples 2 through 6 show that the use of an unoxidized coconut precursor carbon, an aqueous solution of iron chloride hexahydrate and dicyandiamide, and the lower processing temperature of 500° C., produce activated carbon with high CDN values. While not wishing to be bound by theory, it is believed that the disclosed processes are widely applicable to many precursor activated carbon materials that are not oxidized, including precursor activated carbons that are formed from coconut such as OLC and GW-THM.

Examples 11-18, the iron added (if any) is by way of an aqueous solution containing $FeCl_3 \cdot 6H_2O$. In Examples 18 and 19, the precursor activated carbon is GW-THM4, the precursor activated carbon is oxidized, and doping is performed by a single stage process. The results of Examples 13-36 show that when the precursor activated carbon is oxidized and the nitrogen source is DCD, both low tem-

TABLE 1

| Ex. | Precursor Activated Carbon (not oxidized) | N Source (aq.) | Fe added (wt. %, dry precursor activated carbon basis) | N added (wt. % N, dry precursor activated carbon basis) | Calcine Temp. (° C.) | CDN | $I_2$ (mg/g) | N (wt. %, after calcine) | Apparent Density (g/cm³) |
|---|---|---|---|---|---|---|---|---|---|
| Ex. 1 | OLC | DCD | 0.1 | 0.5 | 500 | 1.9 | 1088 | 1.36 | 0.507 |
| Ex. 2 | OLC | DCD | 0.5 | 2.2 | 500 | 24.2 | 959 | 2.01 | 0.558 |
| Ex. 3 | OLC | DCD | 0.9 | 4.3 | 500 | 54.8 | 858 | 3.05 | 0.579 |
| Ex. 4 | OLC | DCD | 1.8 | 8.3 | 500 | 61.2 | 850 | 4.46 | 0.532 |
| Ex. 5 | OLC | DCD | 3.6 | 16.7 | 500 | 73.6 | 612 | 7.45 | 0.594 |
| Ex. 6 | GW-THM | DCD | 0.9 | 4.3 | 500 | 22.3 | 719 | 3.65 | 0.567 |
| Ex. 7 | OLC | DCD | 0.9 | 4.3 | 950 | 6.4 | 796 | 1.28 | 0.520 |
| Ex. 8 | OLC | Urea | 0.5 | 2.2 | 500 | 1.7 | | | 0.519 |
| Ex. 9 | OLC | Urea | 0.9 | 4.3 | 500 | 2.3 | | | 0.529 |
| Ex. 10 | OLC | Urea | 0.9 | 9.5 | 500 | 6.6 | | | 0.519 |
| Ex. 11 | OLC | Urea | 0.9 | 4.3 | 950 | 5.3 | | | 0.523 |
| Ex. 12 | OLC | Urea | 0.9 | 9.5 | 950 | 7.4 | | | 0.531 |
| Comp. Ex. 1 | OLC | None | 0.9 | 0.0 | 500 | 1.8 | | | 0.514 |
| Comp. Ex. 2 | OLC | DCD | 0.0 | 4.3 | 500 | 2.8 | | | 0.520 |
| Comp. Ex. 3 | OLC | Urea | 0.0 | 4.3 | 500 | 1.4 | | | 0.518 |
| Comp. Ex. 4 | OLC | None | 0.9 | 0.0 | 950 | 2.4 | | | 0.495 |
| Comp. Ex. 5 | OLC | DCD | 0.0 | 4.3 | 950 | 2.7 | | | 0.507 |
| Comp. Ex. 6 | OLC | Urea | 0.0 | 4.3 | 950 | 2.1 | | | 0.498 |
| Comp. Ex. 7 | OLC | None | 0.0 | 0.0 | No calcine | 1.1 | 1125 | | 0.558 |
| Comp. Ex. 8 | OLC | None | 0.0 | 0.0 | 950 | 2.5 | | | 0.549 |
| Comp. Ex. 9 | GW-THM | None | 0.0 | 0.0 | No calcine | 1.0 | 1044 | | 0.553 |
| Comp. Ex. 10 | GW-THM | None | 0.0 | 0.0 | 950 | 2.2 | | | 0.569 |

The results of Examples 13-36 and Comparative Examples 11-18 are shown in Table 2, which details the process conditions, the CDN, gravimetric iodine number, amount of N as measured after calcination, and the apparent density of the sorbent material. In Examples 13-17, 20-24, and 27-34 and Comparative Examples 11-17, the precursor activated carbon is OLC, the precursor activated carbon is oxidized. For each of Examples 13-36 and Comparative perature (500° C.) and high temperature (900° C.) calcining results in good chloramine performance. The results of Examples 27-36 show that when the precursor activated carbon is oxidized and the nitrogen source is urea, high temperature calcining is required for good chloramine performance. Examples 14-36 generally have higher CDN values than Comparative Examples 11-18.

TABLE 2

| Ex. | Precursor Activated Carbon (Oxidized) | N Source (aq.) | Fe added (wt. %, dry precursor activated carbon basis) | N added (wt. % N, dry precursor activated carbon basis) | Calc. Temp. (° C., $N_2$ atmos.) | CDN | $I_2$ (mg/g) | N (wt. % post calc.) | AD (g/cm³) |
|---|---|---|---|---|---|---|---|---|---|
| Ex. 13 | OLC | DCD | 0.1 | 0.5 | 500 | 2.8 | 1030 | 1.19 | 0.477 |
| Ex. 14 | OLC | DCD | 0.5 | 2.2 | 500 | 28.7 | 998 | 1.85 | 0.484 |
| Ex. 15 | OLC | DCD | 0.9 | 4.3 | 500 | 35.3 | 881 | 1.90 | 0.490 |
| Ex. 16 | OLC | DCD | 1.8 | 8.3 | 500 | 80.2 | 907 | 4.66 | 0.515 |
| Ex. 17 | OLC | DCD | 3.6 | 16.7 | 500 | 125.6 | 731 | 8.15 | 0.561 |

TABLE 2-continued

| Ex. | Precursor Activated Carbon (Oxidized) | N Source (aq.) | Fe added (wt. %, dry precursor activated carbon basis) | N added (wt. % N, dry precursor activated carbon basis) | Calc. Temp. (° C., N$_2$ atmos.) | CDN | I$_2$ (mg/g) | N (wt. % post calc.) | AD (g/cm$^3$) |
|---|---|---|---|---|---|---|---|---|---|
| Ex. 18 | GW-THM | DCD | 0.5 | 2.2 | 500 | 16.1 | 876 | 2.73 | 0.551 |
| Ex. 19 | GW-THM | DCD | 0.9 | 4.3 | 500 | 48.0 | 844 | 3.81 | 0.565 |
| Ex. 20 | OLC | DCD | 0.1 | 0.5 | 950 | 9.0 | 1111 | 1.40 | 0.475 |
| Ex. 21 | OLC | DCD | 0.5 | 2.2 | 950 | 28.9 | 1023 | 1.72 | 0.494 |
| Ex. 22 | OLC | DCD | 0.9 | 4.3 | 950 | 24.6 | 911 | 1.96 | 0.481 |
| Ex. 23 | OLC | DCD | 1.8 | 8.3 | 950 | 19.9 | 683 | 1.34 | 0.497 |
| Ex. 24 | OLC | DCD | 3.6 | 16.7 | 950 | 14.1 | 507 | 1.13 | 0.467 |
| Ex. 25 | GW-THM | DCD | 0.5 | 2.2 | 950 | 28.6 | 906 | 1.90 | 0.542 |
| Ex. 26 | GW-THM | DCD | 0.9 | 4.3 | 950 | 28.8 | 760 | 1.71 | 0.544 |
| Ex. 27 | OLC | Urea | 0.1 | 0.5 | 950 | 6.7 | 1014 | 1.37 | 0.479 |
| Ex. 28 | OLC | Urea | 0.5 | 2.2 | 950 | 18.0 | 1028 | 1.54 | 0.481 |
| Ex. 29 | OLC | Urea | 0.5 | 2.2 | 500 | 3.2 | 1016 | 1.80 | 0.500 |
| Ex. 30 | OLC | Urea | 0.9 | 4.3 | 500 | 3.4 | 999 | 2.31 | 0.501 |
| Ex. 31 | OLC | Urea | 1.8 | 8.3 | 500 | 7.1 | 944 | 3.18 | 0.499 |
| Ex. 32 | OLC | Urea | 0.9 | 4.3 | 950 | 23.9 | 897 | 1.63 | 0.472 |
| Ex. 33 | OLC | Urea | 1.8 | 8.3 | 950 | 19.1 | 744 | 1.42 | 0.488 |
| Ex. 34 | OLC | Urea | 3.6 | 16.7 | 950 | 15.8 | 585 | 1.27 | 0.496 |
| Ex. 35 | GW-THM | Urea | 0.9 | 4.3 | 950 | 17.8 | 791 | 1.50 | 0.526 |
| Ex. 36 | GW-THM | Urea | 0.2 | 14.4 | 950 | 23.5 | | | 0.535 |
| Comp. Ex. 11 | OLC | None | 0.9 | 0.0 | 500 | 1.8 | | | 0.503 |
| Comp. Ex. 12 | OLC | DCD | 0.0 | 4.3 | 500 | 2.7 | | | 0.508 |
| Comp. Ex. 13 | OLC | Urea | 0.0 | 4.3 | 500 | 1.9 | | | 0.495 |
| Comp. Ex. 14 | OLC | None | 0.9 | 0.0 | 950 | 2.6 | | | 0.475 |
| Comp. Ex. 15 | OLC | DCD | 0.0 | 4.3 | 950 | 3.6 | | | 0.502 |
| Comp. Ex. 16 | OLC | Urea | 0.0 | 4.3 | 950 | 3.6 | | | 0.477 |
| Comp. Ex. 17 | OLC | None | 0.0 | 0.0 | 450 | 2.0 | 1019 | | 0.512 |
| Comp. Ex. 18 | GW-THM | None | 0.0 | 0.0 | 500 | 4.2 | 857 | | 0.551 |

Figure 4:
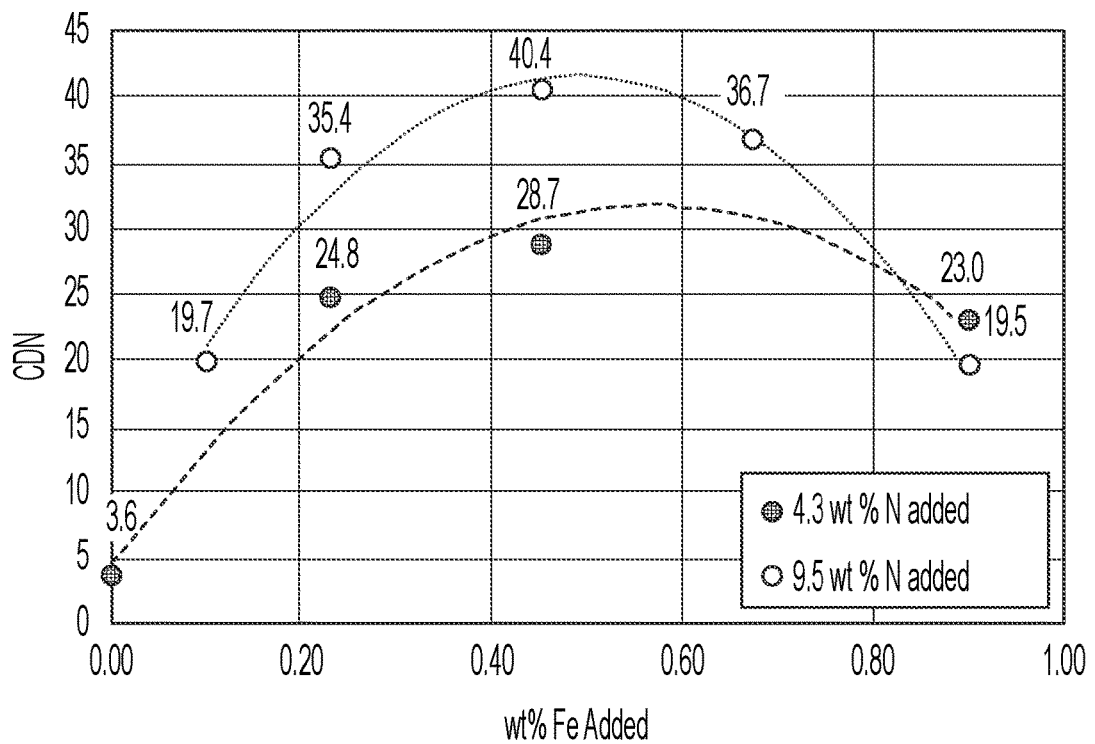
FIG. 4 depicts selected experimental results according to several embodiments.
Figure 5:
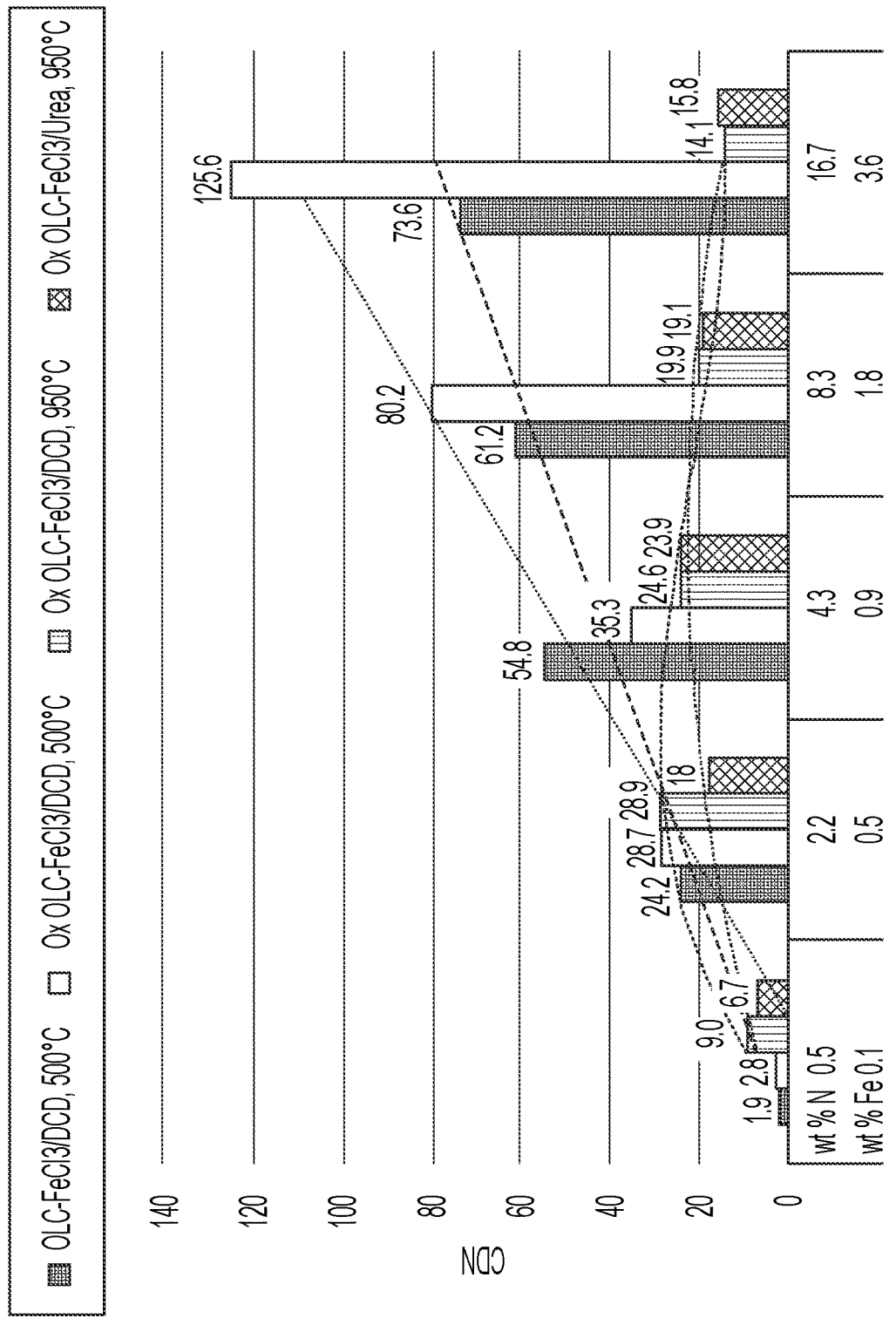
FIG. 5 depicts selected experimental results according to several embodiments.

Following numerous studies, it is believed that there is a degree of interaction between the iron and the nitrogen that is added to the precursor carbon. In one group of experiments, the amount of iron was varied for two fixed amounts of nitrogen (the amount nitrogen added to the carbon prior to thermal treatment was fixed at one of 4.3 wt. % or 9.5 wt. % on a dry precursor activated carbon basis) and the CDN performance was measured for each sample. The doping was carried out as single stage doping. The results of the testing are shown in FIG. 4. For example, in samples prepared from oxidized OLC precursor activated carbon and which are calcined at 950° C. When about 0.20 wt. % to about 0.50 wt. % of iron based on the total weight of the sorbent material is added, the sorbent material achieves CDN values of about 35.4 to about 40.4 depending on the amount of iron that is added when nitrogen is added to the carbon at level of 9.5 wt %. However, in the same samples that are calcined at 950° C. to yield 4.3 wt. % N, adding about 0.20 wt. % to about 0.50 wt. % iron based on the total weight of the sorbent material achieves CDN values of about 24.8 to about 28.7. The overall results of the interaction between iron and nitrogen are plotted in FIG. 5, which summarizes CDN data for sorbent material that is formed from Fe—N doped, from either unoxidized OLC feedstock (OLC) or oxidized precursor activated carbon that was prepared from OLC (Ox OLC).

Figure 7A:
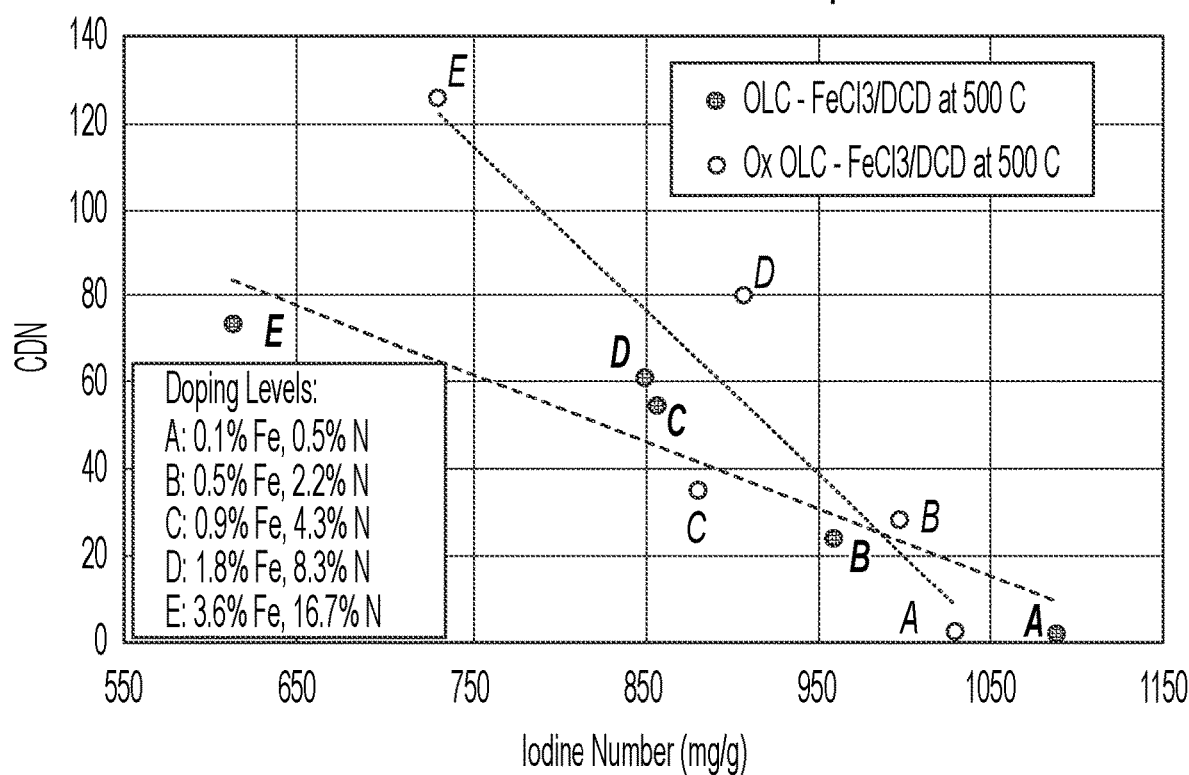
FIG. 7A depicts the chloramine destruction number (CDN) and gravimetric iodine number of selected embodiments.
Figure 7B:
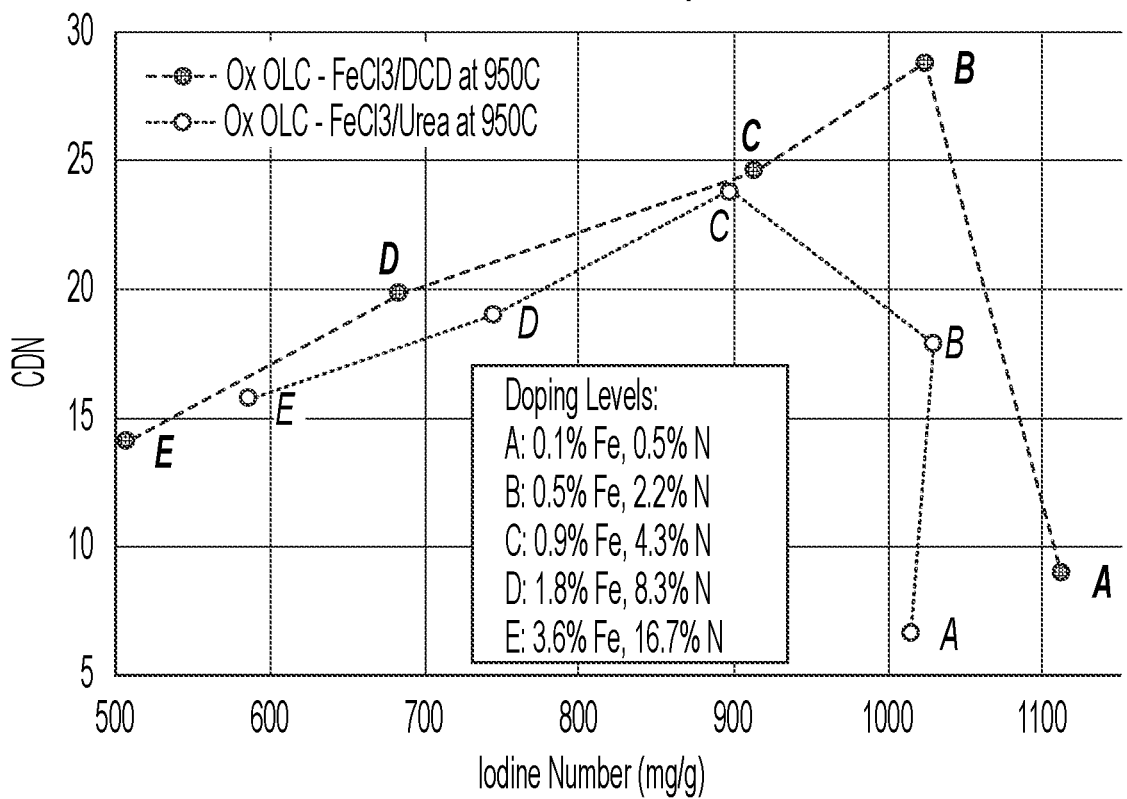
FIG. 7B depicts the CDN and gravimetric iodine number of selected embodiments.
Figure 8A:
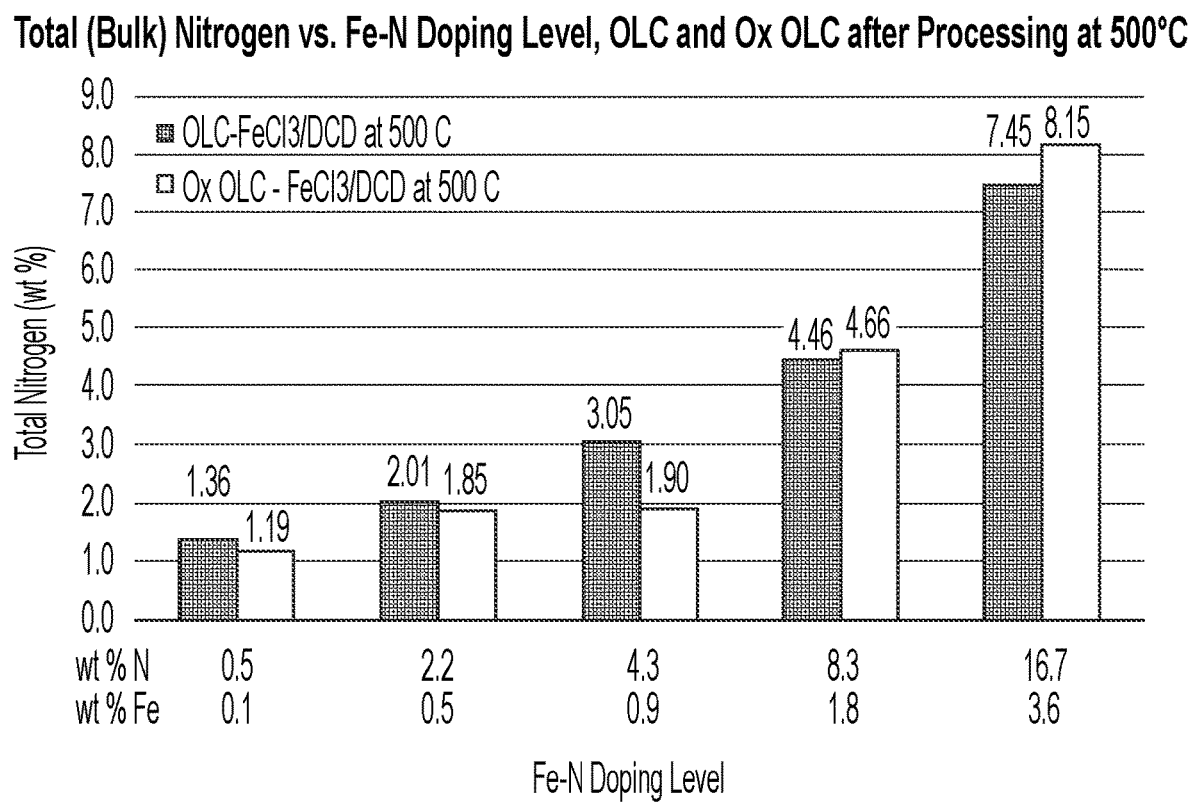
FIG. 8A depicts the loading of nitrogen in sorbent materials for several embodiments.
Figure 8B:
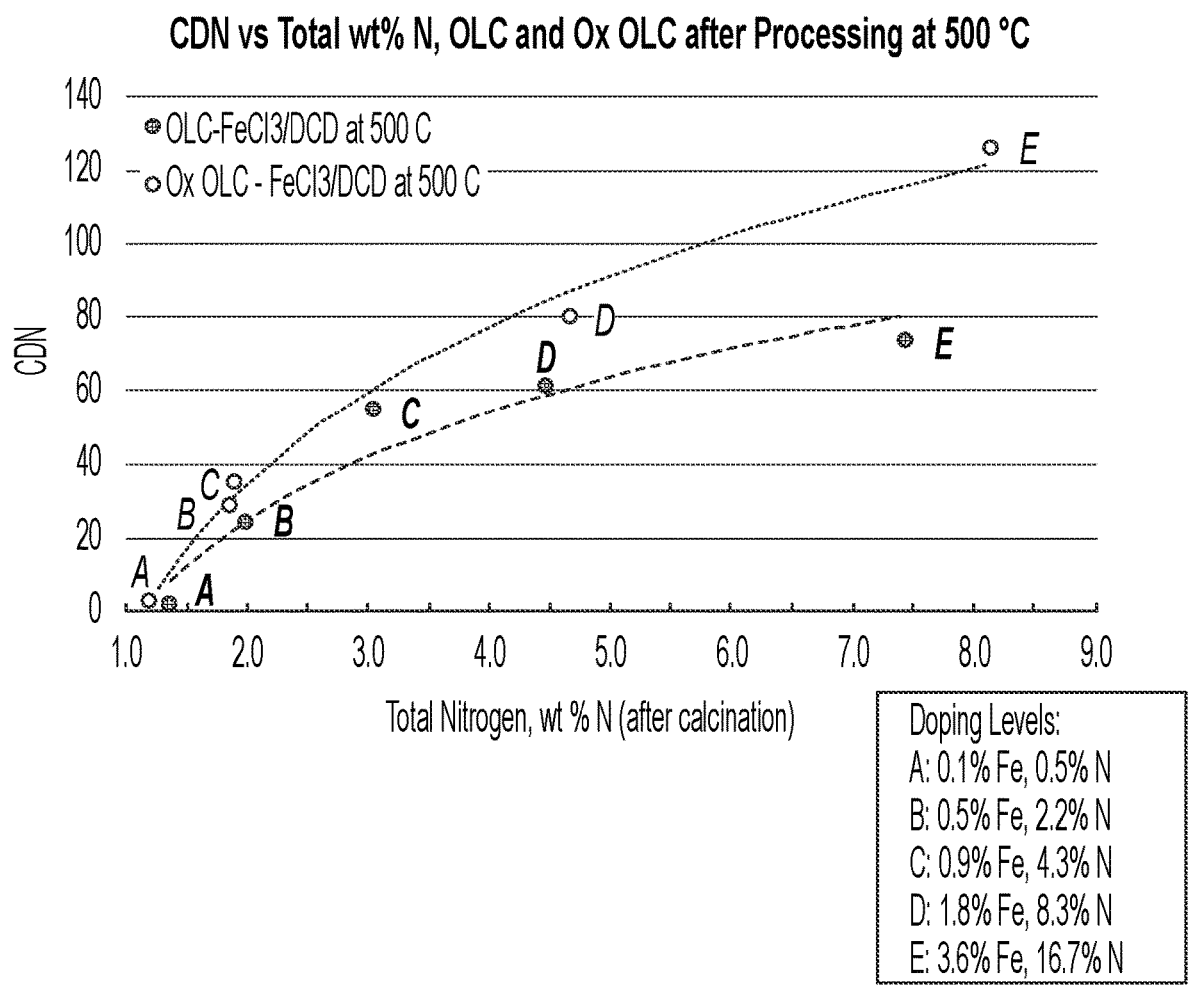
FIG. 8B depicts the CDN performance of the sorbent materials corresponding to FIG. 8A.
Figure 8C:
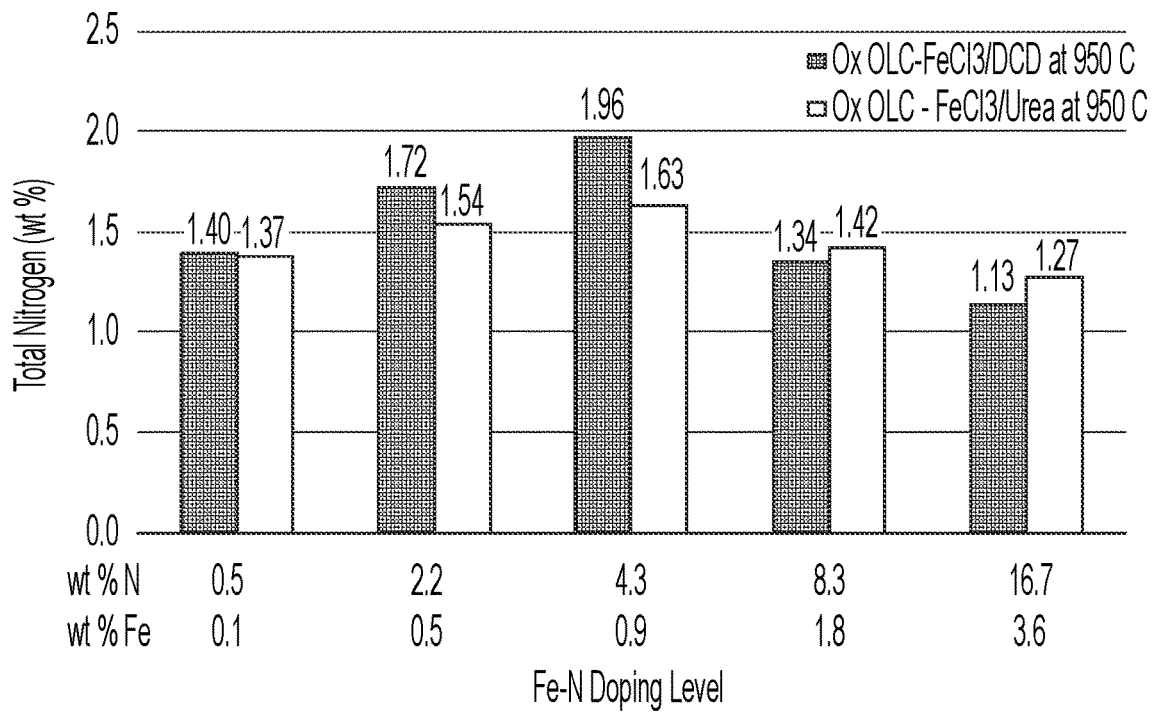
FIG. 8C depicts the bulk loading of nitrogen in sorbent materials for several embodiments.
Figure 8D:
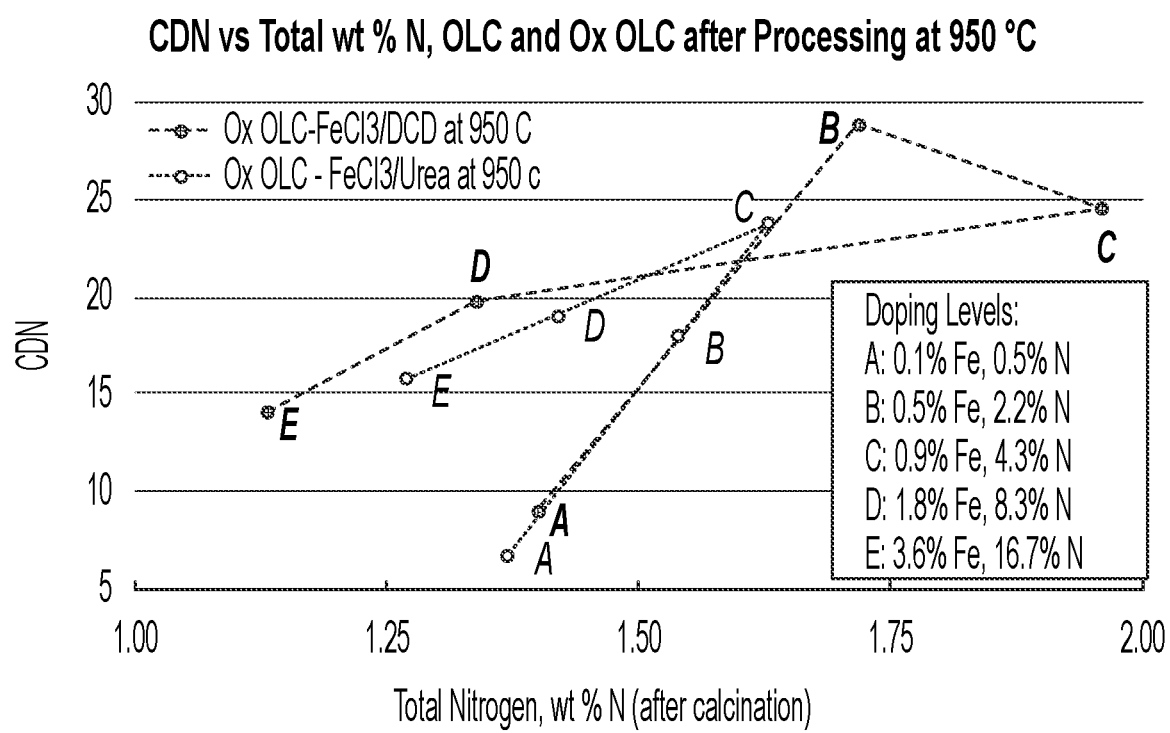
FIG. 8D depicts the CDN performance of the sorbent materials corresponding to FIG. 8C.

Summaries of the performance are also provided. First, the gravimetric iodine number is plotted versus the CDN for sorbent materials that are formed from oxidized and unoxidized OLC precursor activated carbon. For these, doping was performed in a single stage process. FIG. 7A shows these results when the doped precursor activated carbon is calcined at 500° C. and provides relative differences observed for both CDN and iodine number when the precursor activated carbon is unoxidized (OLC) or oxidized (Ox OLC). FIG. 7B shows the results when an oxidized precursor activated carbon has been doped with either iron and dicyandiamide or iron and urea prior to calcination at 950° C. Second, the bulk loading of nitrogen is plotted versus the doping levels for iron and nitrogen. This characterizes the effect of the doping on the actual amount of nitrogen that could be available for catalysis. The bulk loading of nitrogen is shown by FIG. 8A for unoxidized and oxidized OLC precursor activated carbon that is doped in a single stage process and calcined at 500° C. and the corresponding performance as measured in CDN is shown in FIG. 8B. The bulk loading of nitrogen is shown by FIG. 8C for oxidized OLC precursor activated carbon that is doped in a single stage process using either iron and urea or iron and dicyandiamide and calcined at 950° C. and the corresponding performance as measured in CDN is shown in FIG. 8D.

Additional testing to characterize the interaction between the iron and the nitrogen added to the precursor activated carbon was also performed, in these tests for oxidized GW-THM. The results are shown in Table 3.

TABLE 3

| Fe (wt. % added to the precursor activated carbon) | N (wt. % added to the precursor activated carbon) | Apparent Density (g/mL) | Chloramine removal performance, gravimetric (mg/g) | Chloramine removal performance, volumetric (mg/mL) |
|---|---|---|---|---|
| 0 | 12.1 | 0.514 | 66 | 34 |
| 0.09 | 12.1 | 0.488 | 139 | 68 |
| 0.19 | 12.1 | 0.487 | 252 | 123 |
| 0.38 | 12.1 | 0.508 | 291 | 148 |
| 0.90 | 12.1 | 0.508 | 251 | 128 |

Additional testing was performed to determine the CDN, chloramine removal, and chloroform removal performance of the sorbent materials. The chloramine removal and chloroform removal performance were measures both gravimetrically (mg of chloramine removed per g of sorbent material) and volumetrically (mg of chloroform removed per mL of sorbent material). In these tests, a higher number is superior as it indicates more of the compound was removed. The material characteristics of the sorbent material are shown in Table 4. For each of Examples 37-42, calcination of thermal treatment was performed under $N_2$ atmosphere for a duration of one (1) hour.

TABLE 4

| Example | Precursor activated carbon | Fe dopant (wt. % added) | N dopant (wt. % added) | Calcination Temp. (° C., $N_2$ atmosphere) | Apparent Density g/cm³ |
|---|---|---|---|---|---|
| Ex. 37 | OLC, oxidized | FeCl₃ • 6H₂O (0.90 wt. % as Fe) | DCD (6.4 wt. %) | 500 | 0.510 |
| Ex. 38 | OLC, oxidized | FeCl₃ • 6H₂O (0.90 wt. % as Fe) | DCD (6.4 wt. %) | 950 | 0.508 |
| Ex. 39 | OLC, oxidized | FeCl₃ • 6H₂O (0.90 wt. % as Fe) | Urea (8.8 wt. %) | 950 | 0.492 |
| Ex. 40 | OLC, not oxidized | FeCl₃ • 6H₂O (0.90 wt. % as Fe) | DCD (6.4 wt. %) | 500 | 0.553 |
| Ex. 41 | OLC, not oxidized | FeCl₃ • 6H₂O (0.45 wt. % as Fe) | DCD (3.3 wt. %) | 500 | 0.532 |
| Ex. 42 | GW-THM, oxidized | FeCl₃ • 6H₂O (0.19 wt. % as Fe) | Urea (26 wt. %) | 950 | 0.535 |

The performance results of Table 4 are shown in Table 5 below. In Table 5, the results of the CDN are measured as detailed throughout the disclosure. The chloramine removal performance and the chloroform removal performance are listed based on both gravimetric and volumetric measurements. For gravimetric removal of chloramine or chloroform, the units are expressed in amount of compounds removed from a water stream (mg) per mass of sorbent material that the water stream is contacted with (g). For volumetric removal of chloramine or chloroform, the units are expressed in amount of compounds removed from a water stream (mg) per volume of sorbent material that the water stream is contacted with (mL).

TABLE 5

| Example | CDN | Chloramine removal performance, gravimetric (mg/g) | Chloramine removal performance, volumetric (mg/mL) | Chloroform removal performance, gravimetric (mg/g) | Chloroform removal performance, volumetric (mg/mL) |
|---|---|---|---|---|---|
| Ex. 37 | 37.8 | 633 | 323 | 0.37 | 0.19 |
| Ex. 38 | 24.8 | 259 | 132 | 0.63 | 0.32 |
| Ex. 39 | 17.8 | 203 | 100 | 0.66 | 0.32 |
| Ex. 40 | 41.5 | 386 | 213 | 0.73 | 0.40 |
| Ex. 41 | 15.3 | 159 | 85 | 0.88 | 0.47 |
| Ex. 42 | 23.5 | 262 | 140 | 1.26 | 0.67 |

Figure 6:
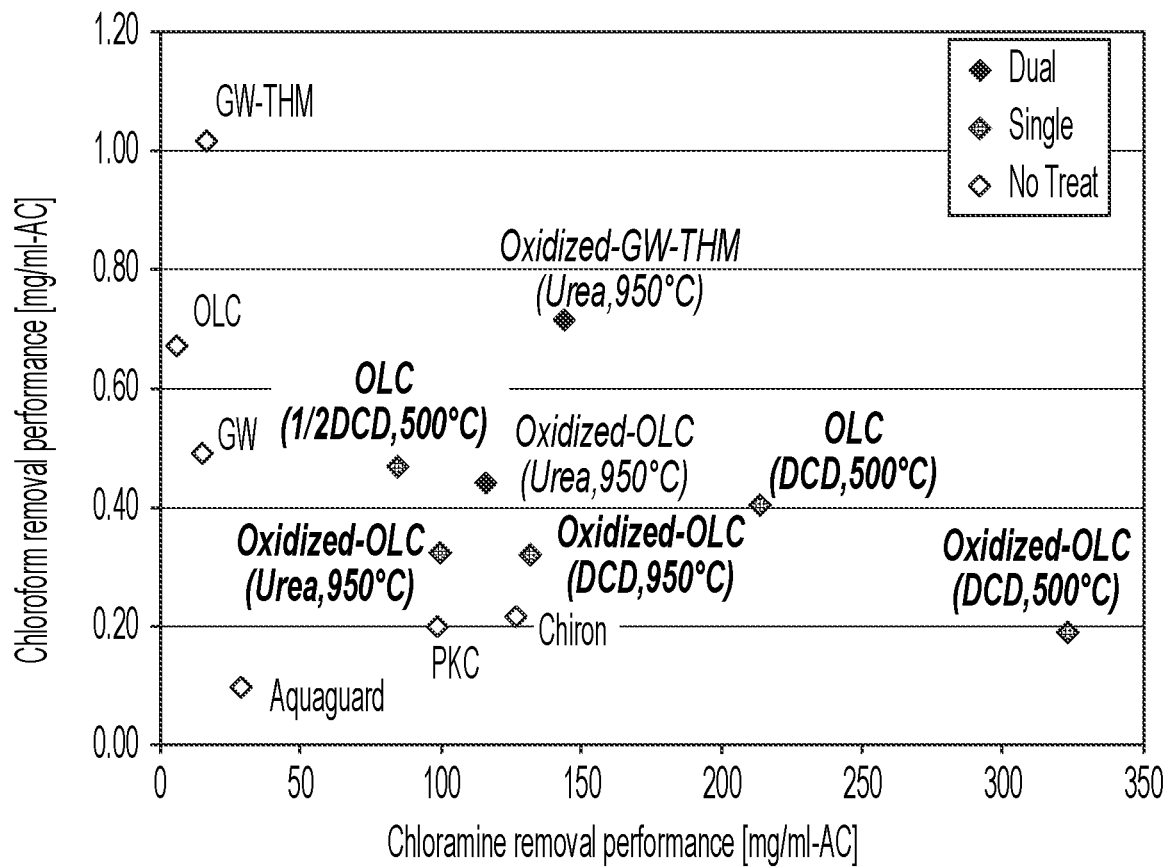
FIG. 6 depicts selected experimental results according to several embodiments.

FIG. 6 is a scatter plot of the volumetric chloroform removal performance (vertical axis) versus the volumetric chloramine removal performance (horizontal axis) for sorbent material samples. Thus, in FIG. 6, a superior sorbent material is one that is present in the center of the plot moving upwards and to the right, as that represents a material with both good chloramine performance and good chloroform performance. This is because liquid streams that contain chloramine that must be removed also tend to contain chloroform that also must be removed. Table 6 describes the sorbent materials that appear in FIG. 6.

TABLE 6

| FIG. 6 Label | Description |
|---|---|
| GW-THM (Comp. Ex. 18) | Coconut shell-based granular activated carbon available from Kuraray Co., Ltd. No additional treatment. |
| GW | Coconut shell-based granular activated carbon available from Kuraray Co., Ltd. No additional treatment. |
| OLC (Comp. Ex. 17) | Coconut shell-based granular activated carbon available from Calgon Carbon Corp. No additional treatment. |
| Aquaguard ® (Comp. Ex. 19) | Wood-based granular activated carbon available from Ingevity, Corp. No additional treatment. |
| PKC (Comp. Ex. 20) | Activated carbon prepared from low sulfur, low-ash bituminous coal having elevated iron and nitrogen content, available from Kuraray Co., Ltd. No additional treatment. |
| Chiron ® (Comp. Ex. 21) | Coal-based granular activated carbon available from Calgon Carbon Corp. and produced according to U.S. Pat. No. 10,702,853. No additional treatment. |
| Oxidized-OLC (DCD, 500° C.) (Ex. 37) | Coconute shell-based granular activated carbon available from Calgon Carbon Corp. Single stage treatment. |
| Oxidized OLC (DCD, 950° C.) (Ex. 38) | Coconut shell-based granular activated carbon available from Calgon Carbon Corp. Single stage treatment. |
| Oxidized OLC (Urea, 950° C.) (Ex. 39) | Coconut shell-based granular activated carbon available from Calgon Carbon Corp. Single stage treatment. |

TABLE 6-continued

| FIG. 6 Label | Description |
|---|---|
| OLC (DCD, 500° C.) (Ex. 40) | Coconut shell-based granular activated carbon available from Calgon Carbon Corp. Single stage treatment. |
| OLC (1/2 DCD, 500° C.) (Ex. 41.) | Coconut shell-based granular activated carbon available from Calgon Carbon Corp. Single stage treatment. |
| Oxidized-GW-THM (Urea, 950° C.) (Ex. 42) | Coconut shell-based granular activated carbon available from Kuraray Co., Ltd. Dual stage treatment. |
| Oxidized-OLC (Urea, 950° C.) | Coconut shell-based granular activated carbon available from Calgon Carbon Corp. Dual stage treatment. Chloramine removal of 116 mg/mL-AC. Chloroform removal of 0.44 mg/mL-AC. |

Testing was also performed by X-ray Photoelectron Spectroscopy (XPS) to characterize the amount and species of nitrogen present in the sorbent materials. Table 7 shows the characteristics of the Examples that were tested by XPS techniques. Table 8 shows the amounts of each element in atomic percent that were detected by NIPS for each of the Examples tested.

TABLE 7

| Example | Precursor activated carbon | Fe—N Dopant (doping technique) | Calcine Temp. (° C.) | Apparent Density (g/mL) | CDN |
|---|---|---|---|---|---|
| Ex. 43 | OLC, not oxidized | $FeCl_3 \cdot 6H_2O$, DCD (single stage) | 500 | 0.524 | 48.2 |
| Ex. 44 | OLC, oxidized | $FeCl_3 \cdot 6H_2O$, DCD (single stage) | 500 | 0.504 | 48.5 |
| Ex. 45 | OLC, oxidized | $FeCl_3 \cdot 6H_2O$, DCD (single stage) | 950 | 0.488 | 29.0 |
| Ex. 46 | OLC, oxidized | $FeCl_3 \cdot 6H_2O$, Urea (single stage) | 950 | 0.507 | 21.4 |
| Ex. 47 | GW-THM, oxidized | $FeCl_3 \cdot 6H_2O$, Urea (two stages) | 950 | 0.535 | 23.5 |

TABLE 8

| Example | C (at. %) | N (at. %) | O (at. %) | Al (at. %) | Si (at. %) | P (at. %) | S (at. %) | Cl (at. %) | Fe (at. %) |
|---|---|---|---|---|---|---|---|---|---|
| Ex. 43 | 92.8 | 1.8 | 5.0 | — | 0.2 | — | — | 0.1 | 0.1 |
| Ex. 44 | 91.1 | 2.1 | 6.4 | — | 0.1 | — | — | 0.1 | 0.1 |
| Ex. 45 | 95.3 | 0.6 | 4.0 | — | 0.1 | — | — | — | — |
| Ex. 46 | 95.2 | 0.6 | 4.1 | — | 0.1 | — | — | — | — |
| Ex. 47 | 94.5 | 0.4 | 5.0 | — | 0.1 | — | — | — | — |

XPS techniques also permit analysis of the type of atomic nitrogen that is present in a sorbent material. For example, some nitrogen out of the total measured nitrogen is "edge nitrogen" which is $N-(C,H)_3$ and is shown by an X-ray peak of 399 eV, and other nitrogen out of the total measured nitrogen is "center nitrogen" which is $N-(C,H)_4^+$ and is shown by an X-ray peak of 401 eV. While not wishing to be bound by theory, it is believed that edge nitrogen has greater catalytic effect versus center nitrogen and that increasing the amount of edge nitrogen out of the total nitrogen improves the CDN of a given sorbent material via increased catalytic activity. Table 7 details the total amount of nitrogen in atomic percentage, the amount of each of the edge nitrogen and the center nitrogen, and the percentage of the total nitrogen that the edge nitrogen and center nitrogen in the Example sorbent materials. The edge nitrogen has a binding energy of 399 eV and is present as $N-(C,H)_3$ and the center nitrogen has a binding energy of 401 eV and is present as $N-(C,H)_4^+$.

TABLE 9

| Example | Total N (at. %) | Amount Edge Nitrogen, N-(C,H)$_3$ at 399 eV (at. %) | Amount Center Nitrogen, N-(C,H)$_4^+$ at 401 eV (at. %) | % Edge Nitrogen | % Center Nitrogen |
|---|---|---|---|---|---|
| Ex. 43 | 1.8 | 1.8 | — | 100% | 0% |
| Ex. 44 | 2.1 | 2.1 | — | 100% | 0% |
| Ex. 45 | 0.6 | 0.3 | 0.3 | 50% | 50% |
| Ex. 46 | 0.6 | 0.3 | 0.3 | 50% | 50% |
| Ex. 47 | 0.4 | 0.2 | 0.2 | 50% | 50% |

From the data of Tables 7-9, Examples 43 and 44t were calcined at a temperature of 500° C. and each have 100% edge nitrogen, which is unique among the Examples. Calcining at 950° C. results in samples (Examples 45-47) that have an equal amount of edge nitrogen and center nitrogen. Based on this data and not wishing to be bound by theory, it appears that Fe—N doping of the samples imparts a significant amount of edge nitrogen and the edge nitrogen assists with the overall catalytic function of the carbon. Surprisingly, the absolute total amount of surface nitrogen was less important than the proportion and amount of the edge nitrogen on the Example sorbent materials.

XPS techniques were also used to determine the amount and type of oxygen bonding, and the results are shown in Table 10. In Table 10, the total oxygen content in atomic percentage is shown along with the amount attributed to double bonds with carbon and the amount attributed to single bonds with carbon. The percentages of oxygen present as a double bond are also computed by dividing the amount of each bond configuration of O by the total O content.

TABLE 10

| Example | Total O (at. %) | Amount O as O=C (at. %) | Amount O as O—C (at. %) | % O as O=C | % O as O—C |
|---|---|---|---|---|---|
| Ex. 43 | 4.9 | 2.1 | 2.8 | 42.9 | 57.1 |
| Ex. 44 | 6.3 | 3.0 | 3.3 | 47.6 | 52.4 |
| Ex. 45 | 4.0 | 1.5 | 2.5 | 37.5 | 62.5 |
| Ex. 46 | 4.1 | 1.3 | 2.8 | 31.7 | 68.3 |
| Ex. 47 | 4.9 | 1.7 | 3.2 | 34.7 | 65.3 |

The peroxide destruction number was also determined for a representative group of samples, which are tabulated as Examples 48-51 in which the activated carbon was oxidized and 52 through 55 in which the activated carbon precursor was unoxidized. Comparative Examples 22-23 are control examples that only provide one of the two dopants Fe or N in which the carbon was oxidized. Comparative Examples 24-25 are control examples that only provide one of the two dopants Fe or N in which the carbon was not oxidized. For each of the Examples that were tested for the peroxide destruction number, the precursor activated carbon was OLC. Also, each of the Examples was calcined at 950° C. for one hour in $N_2$ atmosphere. In certain Examples tested for the peroxide destruction number, the OLC was oxidized, and other Examples the OLC was not oxidized before treatment. As described above, because the peroxide number is the length of time in minutes that is required for the buffered solution containing the sorbent material sample to reach 75% of the recorded maximum temperature. Faster times and therefore smaller values of the peroxide number indicate more catalytic activity and thus a higher performance sorbent material. The results of the peroxide number testing are shown in Table 11.

analyzing nitrogen adsorption isothermal curve at 77K by the Horvath-Kawazoe (HK) method and is reported in units of volume of micropore (mL) per weight of sorbent material (g). Nitrogen adsorption isothermal curve was measured at 77K (−196.15° C.) using BELSORP-MAX manufactured by MicrotracBEL Corp. of Osaka, Japan. The nitrogen content is measured by elemental analysis and is reported in wt. %. Apparent density is reported in g/mL. Conductivity of the sorbent materials are also measured and reported in S/cm. Chloramine removal performance and chloroform removal performance are each reported gravimetrically and volumetrically.

In Table 12, the precursor activated carbon of each of Examples 56-59 was oxidized before doping with iron and nitrogen. Examples 56-59 were doped by way of a single stage doping process, where the iron source was $FeCl_3 \cdot 6H_2O$ and the nitrogen source was urea. Examples 34-37 were calcined at 950° C. under a $N_a$ atmosphere.

Also shown in Table 12, Example 40 was tested. The sorbent material of Example 40 was formed by from an OLC precursor activated carbon that was not oxidized. The precursor activated carbon was doped with iron and nitrogen in a single stage process, where the iron source was

TABLE 11

| Example | Precursor activated carbon | Fe-N Dopant (doping technique) | Apparent Density (g/mL) | Fe added (wt. %, dry precursor activated carbon basis) | N added (wt. % N, dry precursor activated carbon basis) | CDN | Peroxide Number (minutes) |
|---|---|---|---|---|---|---|---|
| Ex. 48 | OLC, oxidized | $FeCl_3 \cdot 6H_2O$, Urea (single stage) | 0.491 | 0.3 | 9.5 | 36.9 | 3.4 |
| Ex. 49 | OLC, oxidized | $FeCl_3 \cdot 6H_2O$, Urea (single stage) | 0.488 | 0.5 | 9.5 | 47.6 | 3.8 |
| Ex. 50 | OLC, oxidized | $FeCl_3 \cdot 6H_2O$, Urea (single stage) | 0.482 | 1.0 | 9.5 | 26.8 | 3.9 |
| Ex. 51 | OLC, oxidized | $FeCl_3 \cdot 6H_2O$, Urea (single stage) | 0.489 | 2.0 | 9.5 | 19.5 | 5.5 |
| Comp. Ex. 22 | OLC, oxidized | Urea (single stage) | 0.482 | 0.0 | 9.5 | 3.7 | 43.2 |
| Comp. Ex. 23 | OLC, oxidized | $FeCl_3 \cdot 6H_2O$, (single stage) | 0.473 | 0.5 | 0.0 | 2.9 | 65.4 |
| Ex. 52 | OLC, not oxidized | $FeCl_3 \cdot 6H_2O$, Urea (single stage) | 0.505 | 0.3 | 9.5 | 11.1 | 20.7 |
| Ex. 53 | OLC, not oxidized | $FeCl_3 \cdot 6H_2O$, Urea (single stage) | 0.507 | 0.5 | 9.5 | 9.5 | 15.5 |
| Ex. 54 | OLC, not oxidized | $FeCl_3 \cdot 6H_2O$, Urea (single stage) | 0.500 | 1.0 | 9.5 | 6.9 | 24.0 |
| Ex. 55 | OLC, not oxidized | $FeCl_3 \cdot 6H_2O$, Urea (single stage) | 0.508 | 2.0 | 9.5 | 6.5 | 37.0 |
| Comp. Ex. 24 | OLC, not oxidized | Urea (single stage) | 0.503 | 0.0 | 9.5 | 2.6 | 54.4 |
| Comp. Ex. 25 | OLC, not oxidized | $FeCl_3 \cdot 6H_2O$, (single stage) | 0.496 | 0.5 | 0.0 | 2.5 | 245.2 |

Additional material characterization is shown in Tables 12 and 13, which details the chloramine removal performance and chloroform removal performance versus measured microstructural and compositional data. In Table 12, the micropore volume measures the total estimated volume of pores within the sample each having a pore diameter of about 0.36 nm to about 0.46 nm which is obtained by $FeCl_3 \cdot 6H_2O$ and the nitrogen source was DCD. After doping, the doped precursor activated carbon was dried and subsequently calcined at 500° C. Comparative Examples 26-27 were formed by wood based activated carbons that were not oxidized. Comparative examples 26-27 were doped with only urea as dopant. Comparative Examples 26-27 were calcined at 950° C. under a $N_a$ atmosphere. Comparative Example 28 was formed by GW-H that was oxidized. Comparative Example 28 was doped only with $FeCl_3 \cdot 6H_2O$ as dopant. Comparative Example 28 was calcined at 950° C. under a $N_2$ atmosphere. The Comparative Examples in Table 12 include several wood based activated carbons that were not subjected to the treatment techniques of the disclosure, and also activated carbon based on bituminous coal.

TABLE 12

| Example | Precursor Activated Carbon (treatment) | Apparent Density (g/mL) | Micropore Volume (mL/g) | N Content (wt. %) | Fe Content (mg/kg) | Conductivity (S/cm) |
|---|---|---|---|---|---|---|
| Ex. 56 | GW-H (oxidized, two stage doping, 950° C. $N_2$ calcine) | 0.424 | 0.117 | 1.64 | 3938 | 8.51 |
| Ex. 57 | GW-H (oxidized, two stage doping, 900° C. $N_2$ calcine) | 0.419 | 0.114 | 1.79 | 2847 | 6.77 |
| Ex. 58 | GW (oxidized, two stage doping, 950° C. $N_2$ calcine) | 0.466 | 0.134 | 1.68 | 2195 | 8.85 |
| Ex. 59 | GW-THM (oxidized, two stage doping, 950° C. $N_2$ calcine) | 0.522 | 0.132 | 2.00 | 3994 | 9.75 |
| Ex. 40 | OLC (not oxidized, single stage doping, 500° C. $N_2$ calcine) | 0.553 | 0.128 | 3.22 | 8758 | 10.62 |
| Comp. Ex. 26 | Wood-based steam activated carbon | 0.128 | 0.133 | 1.64 | 415 | 7.96 |
| Comp. Ex. 27 | BGX wood-based activated carbon | 0.261 | 0.108 | 2.21 | 230 | 7.08 |
| Comp. Ex. 28 | GW-H | 0.413 | 0.127 | 1.14 | 1747 | 8.39 |
| Comp. Ex. 29 | Bituminous Coal-Based Activated Carbon (no treatment) | 0.463 | 0.099 | 1.44 | 1273 | 10.43 |

TABLE 13

| | Chloramine Removal | | Chloroform Removal | |
|---|---|---|---|---|
| Example | Gravimetric (mg/g) | Volumetric (mg/mL) | Gravimetric (mg/g) | Volumetric (mg/mL) |
| Ex. 56 | 310 | 131 | 0.77 | 0.33 |
| Ex. 57 | 263 | 110 | 0.62 | 0.26 |
| Ex. 58 | 289 | 135 | 0.82 | 0.38 |
| Ex. 59 | 276 | 144 | 1.37 | 0.72 |
| Ex. 40 | 386 | 213 | 0.73 | 0.40 |
| Comp. Ex. 26 | 64 | 8 | 1.16 | 0.15 |
| Comp. Ex. 27 | 115 | 30 | 0.62 | 0.16 |
| Comp. Ex. 28 | 81 | 33 | 1.34 | 0.55 |
| Comp. Ex. 29 | 199 | 92 | 0.43 | 0.20 |

Further experimentation was performed to determine the effect of different iron sources, such as ferrous chloride tetrahydrate, denoted as $FeCl_2 \cdot 4H_2O$. The testing was performed for precursor activated carbon of oxidized or unoxidized OLC, nitrogen source of DCD or urea added by way of single stage doping, and calcination at 500° C. or 950° C. For each Example, 0.9 wt. % Fe was added to the precursor activated carbon on a dry weight basis, through addition of an aqueous mixture of $FeCl_2 \cdot 4H_2O$ and DCD or urea dissolved in water, and applied in a single-stage doping process. The testing results are shown in Table 14.

TABLE 14

| Example | OLC Oxidized? | Calcination Temp. (° C.) | N added (wt. %, dry precursor activated carbon basis) | N Source | Apparent Density (g/cm³) | CDN |
|---|---|---|---|---|---|---|
| Ex. 60 | No | 500 | 4.3 | DCD | 0.521 | 36.0 |
| Ex. 61 | No | 950 | 4.3 | DCD | 0.506 | 6.6 |
| Ex. 62 | No | 500 | 4.3 | Urea | 0.516 | 3.3 |
| Ex. 63 | No | 950 | 4.3 | Urea | 0.498 | 4.9 |
| Ex. 64 | Yes | 500 | 4.3 | DCD | 0.506 | 36.4 |
| Ex. 65 | Yes | 950 | 4.3 | DCD | 0.488 | 28.8 |
| Ex. 66 | Yes | 500 | 4.3 | Urea | 0.502 | 3.2 |
| Ex. 67 | Yes | 950 | 4.3 | Urea | 0.478 | 19.7 |
| Comp. Ex. 30 | No | 500 | 0 | None | 0.535 | 1.7 |
| Comp. Ex. 31 | No | 950 | 0 | None | 0.495 | 2.1 |
| Comp. Ex. 32 | Yes | 500 | 0 | None | 0.497 | 2.3 |
| Comp. Ex. 33 | Yes | 950 | 0 | None | 0.476 | 2.3 |

Several alternative iron dopants were also tested to determine their effect. The testing was performed for precursor activated carbon of oxidized or unoxidized OLC, nitrogen source of DCD or urea added by way of single stage doping, and calcination at 500° C. or 950° C. For each Example, 0.9 wt. % Fe was added to the precursor activated carbon on a dry weight basis. The testing results are shown in Table 15.

TABLE 15

| Ex. | OLC Oxidized? | Calcine Temp. (° C.) | Fe Dopant Added (wt. %, dry precursor activated carbon basis) | N added (wt. %, dry precursor activated carbon basis) | N Source | Apparent Density (g/cm³) | CDN |
|---|---|---|---|---|---|---|---|
| Ex. 68 | No | 500 | Ammonium hexacyanoferrate (II) | 4.3 | DCD | 0.523 | 25.4 |
| Ex. 69 | No | 500 | Ammonium hexacyanoferrate (II) | 0 | None | 0.511 | 2.5 |
| Ex. 70 | Yes | 950 | Ammonium hexacyanoferrate (II) | 4.3 | Urea | 0.492 | 27.5 |
| Ex. 71 | Yes | 950 | Ammonium hexacyanoferrate (II) | 0 | None | 0.481 | 17.8 |
| Ex. 72 | No | 500 | Ammonium iron (III) oxalate | 4.3 | DCD | 0.515 | 18.6 |
| Ex. 73 | No | 500 | Ammonium iron (III) oxalate | 0 | None | 0.511 | 1.4 |
| Ex. 74 | Yes | 500 | Ammonium iron (III) oxalate | 4.3 | Urea | 0.507 | 28.6 |
| Ex. 75 | Yes | 500 | Ammonium iron (III) oxalate | 0 | None | 0.499 | 2.9 |
| Ex. 76 | Yes | 500 | Ammonium iron (III) sulfate | 4.3 | DCD | 0.504 | 18.7 |
| Ex. 77 | Yes | 500 | Ammonium iron (III) sulfate | 0 | None | 0.500 | 2.8 |
| Ex. 78 | Yes | 950 | Ammonium iron (III) sulfate | 4.3 | Urea | 0.480 | 15.7 |
| Ex. 79 | Yes | 950 | Ammonium iron (III) sulfate | 0 | None | 0.476 | 3.9 |
| Ex. 80 | Yes | 500 | Ferrous sulfate | 4.3 | DCD | 0.497 | 2.8 |
| Ex. 81 | Yes | 500 | Ferrous sulfate | 0 | None | 0.473 | 2.7 |
| Ex. 82 | Yes | 950 | Ferrous sulfate | 4.3 | Urea | 0.496 | 11.7 |
| Ex. 83 | Yes | 950 | Ferrous sulfate | 0 | None | 0.481 | 12.3 |

Additional testing was performed to determine the effect of the disclosed techniques on the peroxide number. First, testing was performed on oxidized OLC precursor activated carbon that was doped with iron and nitrogen, iron, or nitrogen in a single stage process. The iron source was iron(III) chloride hexahydrate and the nitrogen source was urea. Calcination was performed at 950° C. for one (1) hour under $N_2$ atmosphere. The amounts of iron and nitrogen are described on a dry precursor activated carbon basis in wt. % and were measured prior to calcination. The results of the testing are shown in Table 16.

TABLE 16

| Example | Fe (wt. %) | N (wt. %) | Apparent Density (g/cm³) | CDN | $H_2O_2$ No. (min) |
|---|---|---|---|---|---|
| Ex. 84 | 0.3 | 9.5 | 0.491 | 36.9 | 3.4 |
| Ex. 84 | 0.5 | 9.5 | 0.488 | 47.6 | 3.8 |
| Ex. 86 | 1.0 | 9.5 | 0.482 | 26.8 | 3.9 |
| Ex. 87 | 2.0 | 0.0 | 0.489 | 19.5 | 5.5 |
| Comp. Ex. 34 | 0.0 | 9.5 | 0.482 | 3.7 | 43.2 |
| Comp. Ex. 35 | 0.5 | 0.0 | 0.473 | 2.9 | 65.4 |

Testing was also performed OLC precursor activated carbon that was not oxidized and that was doped with iron and nitrogen, iron, or nitrogen in a single stage process. The iron source was iron(III) chloride hexahydrate and the nitrogen source was urea. Calcination was performed at 950° C. for one (1) hour under $N_2$ atmosphere. The amounts of iron and nitrogen are described on a dry precursor activated carbon basis in wt. %, and were measured prior to calcination. The results of the testing are shown in Table 17.

TABLE 17

| Example | Fe (wt. %) | N (wt. %) | Apparent Density (g/cm³) | CDN | $H_2O_2$ No. (min) |
|---|---|---|---|---|---|
| Ex. 88 | 0.3 | 9.5 | 0.505 | 11.1 | 20.7 |
| Ex. 89 | 0.5 | 9.5 | 0.507 | 9.5 | 15.5 |
| Ex. 90 | 1.0 | 9.5 | 0.500 | 6.9 | 24.0 |
| Ex. 91 | 2.0 | 0.0 | 0.508 | 6.5 | 37.0 |
| Comp. Ex. 36 | 0.0 | 9.5 | 0.503 | 2.6 | 54.4 |
| Comp. Ex. 37 | 0.5 | 0.0 | 0.496 | 2.5 | 245.2 |

Further testing was performed to determine the peroxide number for wood based precursor activated carbon that was doped with iron and nitrogen, iron only, or nitrogen only in a single stage process. BGE is a wood-based granular activated carbon that is commercially available from Calgon Carbon Corp. The iron source was iron(III) chloride hexahydrate and the nitrogen source was urea. Calcination was performed at 950° C. under $N_2$ atmosphere. The amounts of iron and nitrogen are described on a dry precursor activated carbon basis in wt. %, and were measured prior to calcination. The results of the testing are shown in Table 18.

TABLE 18

| Example | Fe (wt. %) | N (wt. %) | Calcine Time (min) | Apparent Density (g/cm³) | $H_2O_2$ No. (min) |
|---|---|---|---|---|---|
| Ex. 92 (BGE) | 0.25 | 9.5 | 30 | 0.294 | 10.7 |
| Ex. 93 (BGE) | 0.25 | 9.5 | 60 | 0.300 | 8.5 |
| Comp. Ex. 38 (BGE) | 0.0 | 0.0 | | 0.270 | >60 |
| Comp. Ex. 39 (BGE) | 0.0 | 9.5 | 60 | 0.294 | 96.6 |

TABLE 18-continued

| Example | Fe (wt. %) | N (wt. %) | Calcine Time (min) | Apparent Density (g/cm³) | H₂O₂ No. (min) |
|---|---|---|---|---|---|
| Comp. Ex. 40 (BGE) | 0.25 | 0.0 | 60 | 0.287 | >60 |
| Comp. Ex. 19 (AquaGuard ®) | | | | 0.313 | 63.4 |

Additional testing was also performed to determine the applicability of the treatments disclosed herein to different precursor activated carbons that include differing carbonaceous materials. Coal and coconut carbonaceous materials were each tested. The Comparative Examples were not treated and were tested as a baseline for chloramine removal, with the percentage increase reported between the Examples and the Comparative Examples. The Examples were treated, and treatment was performed with single stage doping, iron(III) chloride hexahydrate iron source, urea nitrogen source, and calcine at 950° C. under N₂ atmosphere. The results are shown in Table 19.

TABLE 19

| Ex. (treat./ no treat.) | Precursor Activated Carbon | Fe (mg/kg) | N (wt. %) | Apparent Density (g/mL) | Chloramine Removal (mass basis, mg/g AC) (% increase) | Chloramine Removal (vol. basis, mg/mL AC) (% increase) |
|---|---|---|---|---|---|---|
| Comp. Ex. 20 (no treat.) | PKC | 1097 | 1.51 | 0.522 | 203 | 106 |
| Ex. 94 (treat.) | PKC | 2635 | 1.65 | 0.504 | 264 (30%) | 133 (25%) |
| Comp. Ex. 41 (no treat.) | U.S. Patent Application Publication No. 2019/0329235 | 3708 | 1.33 | 0.514 | 112 | 58 |
| Ex. 95 (treat.) | U.S. Patent Application Publication No. 2019/0329235 | 4025 | 1.63 | 0.499 | 163 (45%) | 81 (40%) |
| Comp. Ex. 42 (no treat.) | Oxidized GW-THM | 45 | 1.00 | 0.574 | 66 | 38 |
| Ex. 96 (treat.) | Oxidized GW-THM | 1900 | 1.80 | 0.510 | 254 (384%) | 130 (342%) |

The techniques of the disclosure were analyzed to determine advantages when applied to different precursor activated carbons that were each formed from coal. As described above in Table 19, the techniques provided performance gains for catalytic activated carbon precursors that were formed from coal, which were Examples 94 and 95. Table 20 shown below details the performance gains that can be achieved by treating both unoxidized and oxidized coal based activated carbon precursor in accordance with the disclosure. Critically, these results are achieved for activated carbon that is not catalytic. The performance in Table 20 is measured by the CDN. The improvement is shown between each series of Examples and Comparative Examples versus a completely untreated sample of coal based activated carbon precursor. The greater the CDN of the treated sample, the greater the improvement ratio between the untreated activated carbon and therefore the greater the improvement attributable to the processes described herein.

TABLE 20

| Ex. | Precursor Activated Carbon | Fe (wt. % added to precursor AC) | N (wt. % added to precursor AC by DCD) | Apparent Density (g/cm³) | CDN (improvement ratio vs. untreated carbon) |
|---|---|---|---|---|---|
| Comp. Ex. 43 | F400 (no treatment) | 0 | 0 | 0.574 | 1.5 |
| Comp. Ex. 44 | F400 (calcine at 950° C., N₂) | 0 | 0 | 0.542 | 1.8 (1.2) |
| Comp. Ex. 45 | F400 (calcine at 950° C., N₂) | 0 | 4.3 | 0.557 | 5.8 (3.9) |
| Ex. 96 | F400 (calcine at 950° C., N₂) | 0.9 | 4.3 | 0.538 | 3.0 (2.0) |
| Ex. 97 | F400 (calcine at 500° C., N₂) | 1.8 | 8.3 | 0.603 | 66.6 (44.4) |
| Ex. 98 | F400 (calcine at 500° C., N₂) | 0.9 | 4.3 | 0.572 | 25.6 (17.1) |
| Ex. 99 | F400 (calcine at 500° C., N₂) | 0.5 | 2.2 | 0.551 | 11.5 (7.7) |
| Comp. Ex. 46 | F400 (oxidized, calcine at 450° C., air) | 0 | 0 | 0.562 | 2.2 |
| Comp. Ex. 47 | F400 (oxidized, calcine at 950° C., N₂) | 0 | 4.3 | 0.556 | 15.3 (7.0) |
| Ex. 100 | F400 (oxidized, calcine at 500° C., N₂) | 0.9 | 4.3 | 0.508 | 50.1 (22.8) |
| Ex. 101 | F400 (oxidized, calcine at 950° C., N₂) | 0.9 | 4.3 | 0.556 | 11.5 (5.2) |

In the above detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be used, and other changes may be made, without departing from the spirit or scope of the subject matter presented herein. It will be readily understood that the aspects of the present disclosure, as generally described herein, and illustrated in the FIGURES, can be arranged, substituted, combined, separated, and designed in a wide variety of different configurations, all of which are explicitly contemplated herein.

The present disclosure is not to be limited in terms of the particular embodiments described in this application, which are intended as illustrations of various aspects. Many modifications and variations can be made without departing from its spirit and scope, as will be apparent to those skilled in the art. Functionally equivalent methods and apparatuses within the scope of the disclosure, in addition to those enumerated herein, will be apparent to those skilled in the art from the foregoing descriptions. Such modifications and variations are intended to fall within the scope of the appended claims. The present disclosure is to be limited only by the terms of the appended claims, along with the full scope of equivalents to which such claims are entitled. It is to be understood that this disclosure is not limited to particular methods, reagents, compounds, compositions or biological systems, which can, of course, vary. It is also to be understood that the terminology used herein is for the purpose of describing particular embodiments only, and is not intended to be limiting.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

It will be understood by those within the art that, in general, terms used herein, and especially in the appended claims (for example, bodies of the appended claims) are generally intended as "open" terms (for example, the term "including" should be interpreted as "including but not limited to," the term "having" should be interpreted as "having at least," the term "includes" should be interpreted as "includes but is not limited to," et cetera). While various compositions, methods, and devices are described in terms of "comprising" various components or steps (interpreted as meaning "including, but not limited to"), the compositions, methods, and devices can also "consist essentially of" or "consist of" the various components and steps, and such terminology should be interpreted as defining essentially closed-member groups. It will be further understood by those within the art that if a specific number of an introduced claim recitation is intended, such an intent will be explicitly recited in the claim, and in the absence of such recitation no such intent is present.

For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (for example, "a" and/or "an" should be interpreted to mean "at least one" or "one or more"); the same holds true for the use of definite articles used to introduce claim recitations.

In addition, even if a specific number of an introduced claim recitation is explicitly recited, those skilled in the art will recognize that such recitation should be interpreted to mean at least the recited number (for example, the bare recitation of "two recitations," without other modifiers, means at least two recitations, or two or more recitations). Furthermore, in those instances where a convention analogous to "at least one of A, B, and C, et cetera" is used, in general such a construction is intended in the sense one having skill in the art would understand the convention (for example, "a system having at least one of A, B, and C" would include but not be limited to systems that have A alone, B alone, C alone, A and B together, A and C together, B and C together, and/or A, B, and C together, et cetera). In those instances where a convention analogous to "at least one of A, B, or C, et cetera" is used, in general such a construction is intended in the sense one having skill in the art would understand the convention (for example, "a system having at least one of A, B, or C" would include but not be limited to systems that have A alone, B alone, C alone, A and B together, A and C together, B and C together, and/or A, B, and C together, et cetera). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

In addition, where features or aspects of the disclosure are described in terms of Markush groups, those skilled in the art will recognize that the disclosure is also thereby described in terms of any individual member or subgroup of members of the Markush group.

As will be understood by one skilled in the art, for any and all purposes, such as in terms of providing a written description, all ranges disclosed herein also encompass any and all possible subranges and combinations of subranges thereof. Any listed range can be easily recognized as sufficiently describing and enabling the same range being broken down into at least equal halves, thirds, quarters, fifths, tenths, et cetera. As a non-limiting example, each range discussed herein can be readily broken down into a lower third, middle third and upper third, et cetera. As will also be understood by one skilled in the art all language such as "up to," "at least," and the like include the number recited and refer to ranges that can be subsequently broken down into subranges as discussed above. Finally, as will be understood by one skilled in the art, a range includes each individual member. Thus, for example, a group having 1-3 components refers to groups having 1, 2, or 3 components. Similarly, a group having 1-5 components refers to groups having 1, 2, 3, 4, or 5 components, and so forth.

Various of the above-disclosed and other features and functions, or alternatives thereof, may be combined into many other different systems or applications. Various presently unforeseen or unanticipated alternatives, modifications, variations or improvements therein may be subsequently made by those skilled in the art, each of which is also intended to be encompassed by the disclosed embodiments.

The invention claimed is:

1. A sorbent material formed from a carbonaceous material comprising coconut that is activated to form a precursor activated carbon, the sorbent material comprising:

at least about 1.3 wt. % nitrogen as measured on a dry precursor activated carbon basis;

at least about 1,000 mg/kg of iron as measured on a dry precursor activated carbon basis; and wherein the sorbent material has a volumetric chloramine removal amount of about 85 mg/mL or more when measured with a stream of water that contacts the sorbent material.

2. The sorbent material of claim 1 wherein the sorbent material has volumetric chloramine removal performance of about 70 mg/mL to about 350 mg/mL when measured with a stream of water containing chloramine that contacts a volume of the sorbent material.

3. The sorbent material of claim 1, wherein the amount of nitrogen is about 1.3 wt. % to about 3.0 wt. %.

4. The sorbent material of claim 1 wherein the sorbent material has a peroxide destruction number of about 2.5 minutes to about 45 minutes.

5. The sorbent material of claim 1, wherein the sorbent material has a chloramine destruction number (CDN) is at least about 25.

6. The sorbent material of claim 5, wherein the CDN is about 25 to about 125.

7. The sorbent material of claim 1, wherein the peroxide number is less than about 25 minutes.

8. The sorbent material of claim 7, wherein the sorbent material has a peroxide number is about 3 minutes to about 10 minutes.

9. The sorbent material of claim 1 wherein:
the sorbent material contains at least about 0.110 mL/g of micropores, with each micropore having a pore diameter of about 0.36 nm to about 0.46 nm; and
the sorbent material has a volumetric chloroform removal performance of about 0.25 mg/mL or more when measured with a stream of water containing chloroform that contacts a volume of the sorbent material.

10. The sorbent material of claim 9, wherein the sorbent material has a volumetric chloroform removal amount of about 0.25 mg/mL to about 0.90 mg/mL.

11. A method of manufacturing the sorbent material of claim 1, the method comprising:
providing a carbonaceous material;
activating the carbonaceous material to form a precursor activated carbon;
optionally oxidizing the precursor activated carbon;
doping the precursor activated carbon by contacting the precursor activated carbon with an iron source and a nitrogen source to thereby form a doped precursor activated carbon;
calcining the doped precursor activated carbon by heating to a temperature of at least about 400° C. in a calcining atmosphere that does not cause any substantial oxidation or activation of the doped precursor activated carbon to thereby form a sorbent material.

12. The method of claim 11, wherein doping the precursor activated carbon is performed in a two stage process, the two stage process including separate steps of contacting the precursor activated carbon with an iron source and contacting the precursor activated carbon with a nitrogen source.

13. The method of claim 11, wherein contacting the precursor activated carbon with an iron source and contacting the precursor activated carbon with a nitrogen source are each performed with separate aqueous solutions.

14. The method of claim 12, wherein the precursor activated carbon is dried after it is contacted with each aqueous solution containing the iron source and the nitrogen source.

15. The method of claim 11, wherein:
the iron source is one or more of iron(III) chloride hexahydrate ($FeCl_3 \cdot 6H_2O$), iron(II) chloride tetrahydrate ($FeCl_2 \cdot 4H_2O$), ammonium iron(III) sulfate dodecahydrate ($NH_4Fe(SO_4) \cdot 12H_2O$), iron(II) sulfate heptahydrate ($Fe_2SO_4 \cdot 7H_2O$), ammonium iron(III) oxalate trihydrate (($NH_4)_3Fe(C_2O_4)_3 \cdot 3H_2O$), ammonium hexacyanoferrate(II) hydrate (($NH_4)_4[Fe(CN)_6] \cdot xH_2O$), ammonium iron(III) citrate (($NH_4)_5[Fe(C_6H_4O_7)_2]$), sodium ferrocyanide decahydrate ($Na_4Fe(CN)_6 \cdot 10H_2O$), sodium ferrioxalate ($Na_3Fe(C_2O_4)_3$), potassium ferrocyanide trihydrate ($K_4[Fe(CN)_6] \cdot 3H_2O$), potassium ferricyanide ($K_3[Fe(CN)_6]$), potassium ferrooxalate ($K_2[Fe(C_2O_4)_2]$), or iron(II) acetate tetrahydrate ($(CH_3COO)_2Fe \cdot 4H_2O$), ferrous lactate dihydrate, ferrous lactate trihydrate, urea ($CO(NH_2)_2$), compounds thereof, or mixtures thereof; and
the nitrogen source has an oxidation state of −3.

16. The method of claim 15, wherein the nitrogen source is one or more of urea or dicyandiamide.

17. The method of claim 12, wherein calcining is performed at a temperature of about 850° C. to about 1050° C. in a $N_2$ atmosphere.

18. The method of claim 12, wherein the oxidizing is required and is performed.

19. The method of claim 11, wherein doping the precursor activated carbon is performed in a single stage process, the single stage process including a single step of contacting the precursor activated carbon with both an iron source and a nitrogen source.

20. The method of claim 19, wherein contacting the precursor activated carbon with the iron source and the nitrogen source is performed with a single aqueous solution that contains both the iron source and the nitrogen source.

21. The method of claim 20, wherein the precursor activated carbon is dried after it is contacted with the single aqueous solution containing the iron source and the nitrogen source.

22. The method of claim 19, wherein the iron source is iron(III) chloride hexahydrate ($FeCl_3 \cdot 6H_2O$) and the nitrogen source is one or more of urea or dicyandiamide (DCD).

23. The method of claim 19, wherein calcining is performed at a temperature of about 400° C. to about 1050° C. in a $N_2$ atmosphere.

24. The method of claim 23, wherein calcining is performed at a temperature of about 400° C. to about 600° C. in a $N_2$ atmosphere.

25. The method of claim 19, wherein calcining is performed at a temperature of about 850° C. to about 1050° C. in a $N_2$ atmosphere.

26. The method of claim 11, wherein the optional oxidizing is not performed.

27. The method of claim 11, wherein the optional oxidizing is required and is performed.

28. A method of removing chlorine, chloramine, or both chlorine and chloramine from a fluid, the method comprising:
providing a sorbent material, the sorbent material being formed from a carbonaceous material comprising coconut that is activated to form a precursor activated carbon, the sorbent material comprising at least about 1.3 wt. % nitrogen as measured on a dry precursor activated carbon basis; at least about 1,000 mg/kg of iron as measured on a dry precursor activated carbon basis; and wherein the sorbent material has a volumetric chloramine removal amount of about 85 mg/mL or more when measured with a stream of water that contacts the sorbent material, and contacting the sorbent material with a fluid.

29. The method of claim 28, wherein the fluid is liquid water.

30. The method of claim 28, wherein the water or the sorbent material has previously undergone a disinfecting step.

31. The sorbent material of claim 1, wherein the amount of nitrogen is at least about 2.2 wt. %.

* * * * *